(12) United States Patent
Okada et al.

(10) Patent No.: US 7,540,922 B2
(45) Date of Patent: Jun. 2, 2009

(54) THIN FILM FORMING APPARATUS

(75) Inventors: Hideo Okada, Nara (JP); Takao Imanaka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 125 days.

(21) Appl. No.: 10/988,218

(22) Filed: Nov. 12, 2004

(65) Prior Publication Data
US 2005/0145939 A1    Jul. 7, 2005

(30) Foreign Application Priority Data
Nov. 14, 2003   (JP)   ............................ P2003-385768
Dec. 1, 2003    (JP)   ............................ P2003-401637

(51) Int. Cl.
*B05C 11/10*   (2006.01)
(52) U.S. Cl. ..................... 118/665; 118/666; 118/695; 118/708; 118/712; 118/713
(58) Field of Classification Search ................ 118/665, 118/666, 695, 712, 713; 427/9, 10
See application file for complete search history.

(56) References Cited

U.S. PATENT DOCUMENTS

| | | | |
|---|---|---|---|
| 4,453,151 A | | 6/1984 | Leary et al. |
| 5,393,624 A | * | 2/1995 | Ushijima ..................... 430/30 |
| 5,658,615 A | * | 8/1997 | Hasebe et al. ................ 427/240 |
| 5,762,709 A | * | 6/1998 | Sugimoto et al. ............. 118/52 |
| 5,939,130 A | * | 8/1999 | Shiraishi et al. ................ 427/9 |
| 6,319,317 B1 | * | 11/2001 | Takamori ..................... 118/52 |

2002/0182324 A1   12/2002   Kaneko (Continued)

FOREIGN PATENT DOCUMENTS

GB      2 220 679      1/1990

(Continued)

OTHER PUBLICATIONS

Kaneko Shoji, "An outline of a Spray Pyrolysis Deposition (SPD) Technique and its Application to Tin Oxide transparent conducting Film Formation", Function & Materials, CMC Publication Co. Ltd., vol. 20, No. 3, pp. 5-19 (Mar. 2000) (Partial Translation 5 pp.).

(Continued)

*Primary Examiner*—George R Koch, III
(74) *Attorney, Agent, or Firm*—David G. Conlin; Steven M. Jensen; Edwards Angell Palmer & Dodge LLP

(57) ABSTRACT

When a solution sprayed by a spray nozzle portion reaches one surface portion of a substrate, a thin film forming material contained the solution decomposes thermally because the substrate is heated to a prescribed temperature, and a thin film is formed on the one surface portion of the substrate. An imaging section obtains a prescribed information on the thickness of a thin film to be formed on one surface portion of the substrate, and a main control section controls a valve section based on the prescribed information from the imaging section. Since, based on the prescribed information on the thickness of a thin film to be formed on one surface portion of the substrate, the main control section allows the spraying nozzle portion to spray the solution therefrom, a thin film of the desired thickness can be formed with high accuracy.

5 Claims, 19 Drawing Sheets

U.S. PATENT DOCUMENTS

2006/0144330 A1* 7/2006 Takekuma et al. .......... 118/682

FOREIGN PATENT DOCUMENTS

| JP | 51-120238 | 10/1976 |
|----|-----------|---------|
| JP | 04-222655 | 8/1992 |
| JP | 06-249620 | 9/1994 |
| JP | 07-311020 | 11/1995 |
| JP | 10-130097 | 5/1998 |
| JP | 10-158834 | 6/1998 |
| JP | 2001-026885 | 1/2001 |
| JP | 2002-361121 | 12/2002 |

OTHER PUBLICATIONS

S. Kaneko, et al., "Thermal decomposition of di-*n*-butyltin(IV) diacetate as a precursor for the spray pyrolysis deposition of oriented $SnO_2$ films," *Solid State Ionics*,, vol. 141-142, pp. 463-470 (May 1, 2001).

G. Korotcenkov, et al., "Peculiarities of $SnO_2$ thin film deposition by spray pyrolysis for gas sensor application," *Sensors and Actuators B*, vol. 77, No. 1-2, pp. 244-252 (Jun. 15, 2001).

R. V. Todorovska, et al., "Spray pyrolysis deposition of $\beta$-$Fe_2O_3$ thin films using iron (III) citric complexes," *Materials Letters*, vol. 56, No. 5, pp. 770-774 (Nov. 2002).

\* cited by examiner

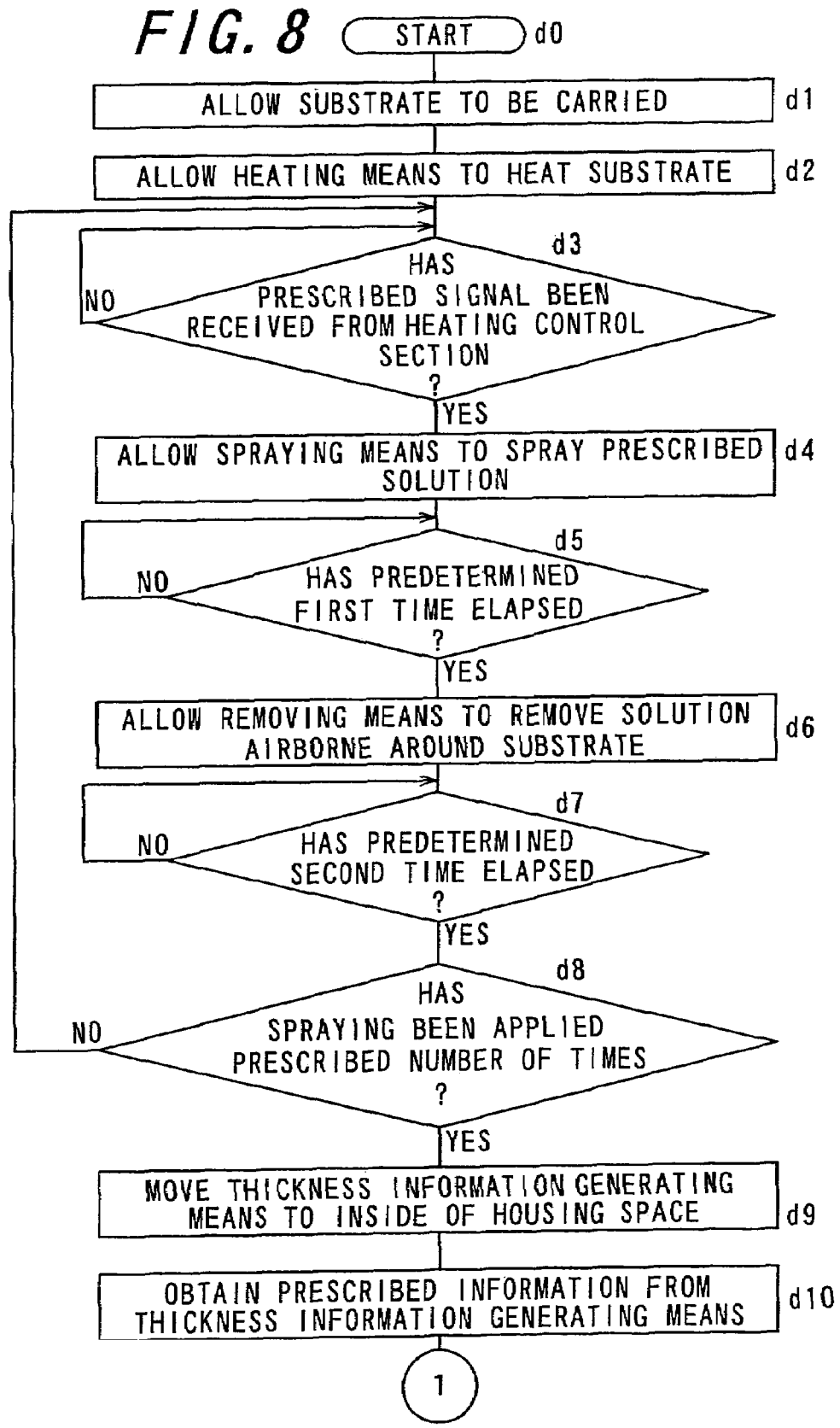

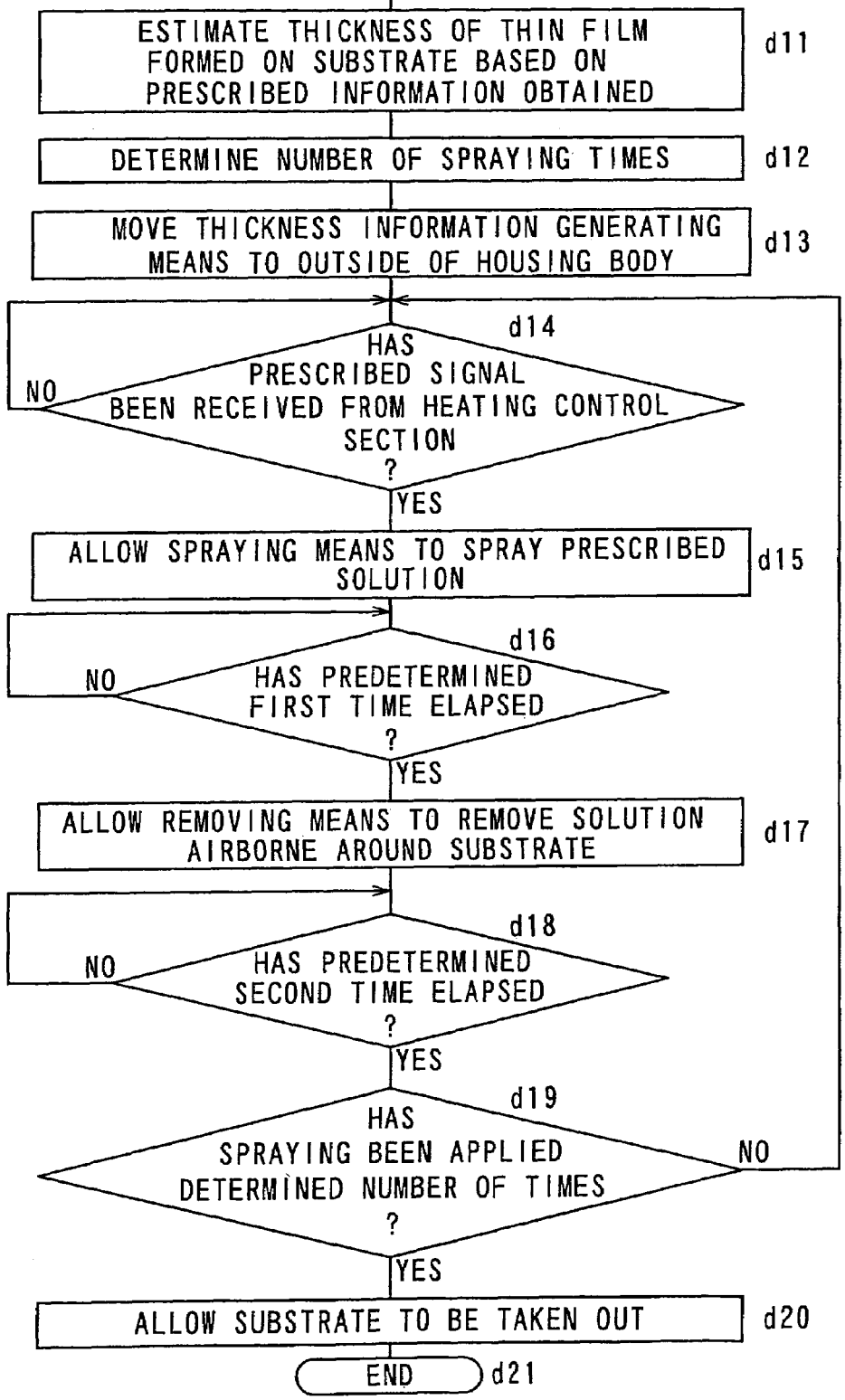

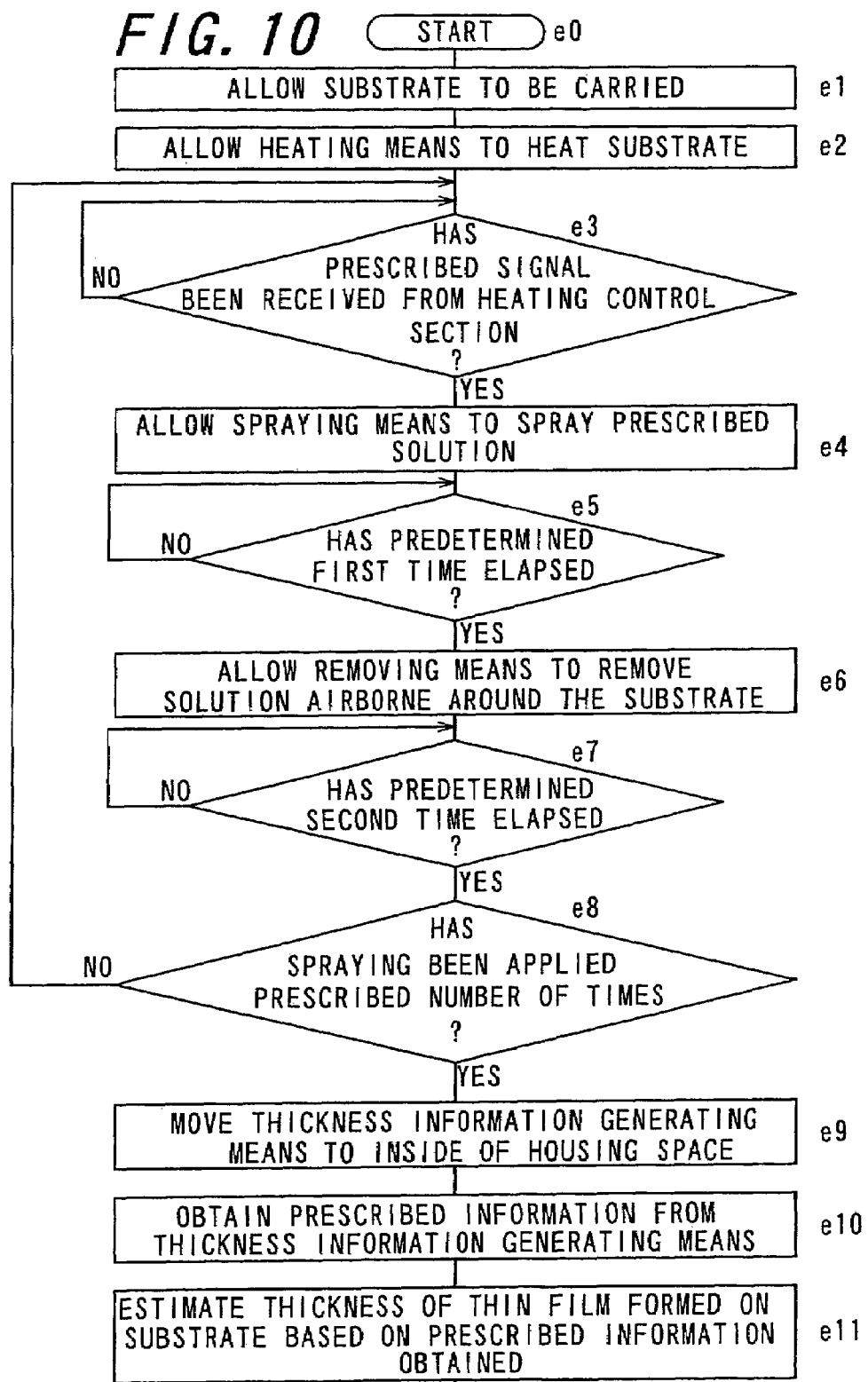

| e12 | MOVE THICKNESS INFORMATION GENERATING MEANS TO OUTSIDE OF HOUSING BODY |

↓ e13: HAS PRESCRIBED SIGNAL BEEN RECEIVED FROM HEATING CONTROL SECTION? — NO (loop back) / YES ↓

| e14 | ALLOW SPRAYING MEANS TO SPRAY PRESCRIBED SOLUTION |

↓ e15: HAS PREDETERMINED FIRST TIME ELAPSED? — NO (loop back) / YES ↓

| e16 | ALLOW REMOVING MEANS TO REMOVE SOLUTION AIRBORNE AROUND SUBSTRATE |

↓ e17: HAS PREDETERMINED SECOND TIME ELAPSED? — NO (loop back) / YES ↓

| e18 | MOVE THICKNESS INFORMATION GENERATING MEANS TO INSIDE OF HOUSING SPACE |

| e19 | OBTAIN PRESCRIBED INFORMATION FROM THIN FILM THICKNESS INFORMATION GENERATING MEANS |

| e20 | ESTIMATE THICKNESS OF THIN FILM FORMED ON SUBSTRATE BASED ON PRESCRIBED INFORMATION OBTAINED |

| e21 | MOVE THICKNESS INFORMATION GENERATING MEANS TO OUTSIDE OF HOUSING BODY |

| e22 | DETERMINE NUMBER OF SPRAYING TIMES |

↓
②

THIN FILM FORMING APPARATUS

BACKGROUND OF THE INVENTION

1. Field of the Invention

The invention relates to a thin film forming apparatus for forming a thin film on a substrate such as a glass substrate, Si-semiconductor, and the like, for instance.

2. Description of the Related Art

As a technique for forming a thin film on a surface of a glass substrate, a spray pyrolysis deposition technique is known. In the spray pyrolysis deposition technique, by spraying a material solution containing a thin film forming material on one surface portion of a heated substrate, a solid phase is deposited from a liquid phase on the heated substrate, and a thin film is formed on one surface portion of the substrate. (For instance, refer to Kaneko Shoji "An outline of a spray pyrolysis deposition (SPD) technique and its application to tin oxide transparent conducting film formation", Function & Materials, CMC Publication Co. Ltd., (Vol. 20, No. 3, March 2000): p. 5-7.) In detail, in the spray pyrolysis deposition technique, a material solution is prepared by dissolving a thin film material in an organic solvent. When this material solution is mixed with a compressed gas and a jet of the mixture is then emitted to a heated plate-like substrate, misty liquid droplets of the material solution are supplied to a surface of a plate-like substrate. The liquid droplets of the material solution are heated on the surface of the plate-like substrate, and an organic solvent as liquid phase evaporates and gasifies. As a result, a thin film material as solid phase precipitates, and the thin film material precipitated grows with deposited on the surface of the plate-like substrate, thereby forming a thin film. As compared with other chemical thin film forming processes such as an atmospheric chemical vapor deposition (CVD) process, the spray pyrolysis deposition has advantages of being capable of forming a film even at a low heating temperature of the substrate, a high rate of film formation and less frequency of maintenance due to simple construction of the apparatus.

In a thin film forming apparatus of conventional art for forming a thin film by using a spray pyrolysis deposition technique, a thin film is formed on one surface portion of a glass substrate heated to a prescribed temperature, by spraying from a nozzle a material solution containing a thin film forming material, together with compressed air. In the thin film forming apparatus, a thin film having a prescribed thickness is formed, by repeating a plurality of times the spraying of the material solution containing a thin film forming material, thereby laminating a thin film. (For instance, see Japanese Unexamined Patent Publications JP-A 10-130097 (1998) AND JP-A-2001-26885.)

In a thin film forming apparatus of a conventional art, a thin film can be formed relatively easily on a surface of a glass substrate, by heating the glass substrate to a prescribed temperature and by spraying a material solution containing a thin film forming material. However the thin film formation speed is not always constant because of, for instance, temperature changes of a glass substrate, changes with time of a nozzle for spraying a material solution, changes in concentration of a material solution and changes in atmosphere of a glass substrate. This poses a problem that it is difficult to form a thin film of a prescribed thickness. The changes in atmosphere of the glass substrate include changes in air current of the glass substrate atmosphere, changes in temperature of the glass substrate atmosphere and changes in humidity of the glass substrate atmosphere.

FIG. 20 is a perspective side view showing schematically the constitution of a conventional thin film forming apparatus 200. The thin film forming apparatus 200 comprises spraying means 203, spraying control means 204, heating means 205, and exhausting means 206. Spraying means 203 emits a jet of a material solution containing a thin film material and an organic solvent to a plate-like substrate 201 and spraying liquid droplets 202 of the material solution. Spraying control means 204 for controls the spraying quantity of the material solution. Heating means 205 heats the plate-like substrate 201. Exhausting means 206 exhausts to the outside an organic solvent vapor evaporating from the material solution by heating. Furthermore, the spraying means 203 comprises material solution reservoir means 207, gas reservoir means 208, and a spray nozzle 209. Material solution reservoir means 207 reserves a material solution. Gas reservoir means 208 reserves a carrier gas to be mixed in the material solution. A spray nozzle 209 mixes the material solution and carrier gas and sprays the mixture on a surface of the plate-like substrate 201. As a carrier gas, compressed air and the like are used. The spraying control means 204 comprises a solenoid valve 210 and valve control means 211. A solenoid valve 210 controls the ON and OFF of the spray nozzle 209. Valve control means 211 controls the opening and closing of the spray nozzle 209 by the solenoid valve 210. The heating means 205 comprises a heater 212 and a stage 213. The heater 212 heats the plate-like substrate 201 The stage 213 holds the plate-like substrate 201 and the heater 212, The stage 213 on which the plate-like substrate 201 and the heater 212 are held is carried to just below the spray nozzle 209 by a carrying means such as a belt conveyer (not shown).

According to the thin film forming apparatus 200, first a material solution from the material solution reservoir means 207 and also a compressed gas from the gas reservoir means 208 are supplied to the spray nozzle 209 respectively. In the spray nozzle 209, the material solution and the compressed gas are mixed, a jet of the mixture is emitted to a surface 201a of a plate-like substrate 201 held by the stage 213, thereby supplying liquid droplets 202 of the material solution by spraying. Since the plate-like substrate 201 is heated to a prescribed temperature by the heater 212, an organic solvent evaporates and vaporizes from the liquid droplets 202 of the sprayed material liquid to allow the thin film forming material to precipitate, thereby forming a thin film on the surface 201a of the plate-like substrate 201. The organic solvent vapor is exhausted to the outside by the exhausting means 206. By repeating this spraying operation a plurality of times, a thin film having a desired thickness can be formed.

As described above, in the thin film forming apparatus 200 based on a spray pyrolysis deposition technique, the spray nozzle 209 is arranged approximately just above the central part of the plate-like substrate 201 to be carried from the outside and be held in a prescribed position.

Meanwhile, when a solution is sprayed from a nozzle to the central part of a flat plane-like substance, the spraying quantity per unit area of the solution becomes large at the central part of the plate-like substance and small at the ends, because of the constructive characteristics of the nozzle.

Accordingly, when a thin film is to be formed on a surface 201a of a plate-like substrate by using a conventional thin film forming apparatus 200, a thin film raised in a direction perpendicular to the surface 201a is formed at the central part of the plate-like substrate 201 because of the position of the spray nozzle 209 and the constructive characteristics, and at the ends of the plate-like substrate 201, a thin film whose thickness is smaller than that at the central part. It is very difficult to form a thin film having a uniform thickness on the entire part of the surface 201a of the plate-like substrate 201 by using the thin film forming apparatus 200. The thin film forming apparatus 200 is not suitable for the formation of an antireflection film requiring an especially uniform thin film.

A method to adjust the thickness of a thin film by moving the plate-like substrate 201 to the position so that the end is just below the spray nozzle 209 after a thin film is formed centering around the central part of a plate-like substrate 201 and by spraying the material solution again can be considered. However, such a method will cause an increase in the number of steps and an increase in material costs, and yet the uniformity of a thin film to be obtained is not fully satisfactory.

SUMMARY OF THE INVENTION

It is an object of the invention to provide a thin film forming apparatus which can form on a substrate a thin film having a desired thickness with high accuracy and can form a thin film having a uniform thickness on the entire surface of a plate-like substrate.

The invention provides a thin film forming apparatus comprising:

a housing body having a housing space formed therein for housing a substrate;

heating means for heating the substrate to be housed inside the housing space to a prescribed temperature;

spraying means for spraying a prescribed solution containing a thin film forming material onto one surface portion of the substrate to be housed in the housing space and to be heated to the prescribed temperature by the heating means;

thickness information generating means for generating prescribed information on thickness of a thin film to be formed on the one surface portion of the substrate by the thin film forming material;

control means for allowing the spraying means to spray the prescribed solution containing the thin film forming material so that the thin film to be formed on the one surface portion of the substrate has a prescribed thickness, on the basis of the prescribed information from the thickness information generating means.

According to the invention, the substrate is housed inside the housing space of the housing body and is heated to the prescribed temperature by the heating means, and then the prescribed solution containing a thin film forming material is sprayed on the one surface portion of the substrate by the spraying means. The prescribed solution sprayed diffuses inside the housing space and reaches the one surface portion of the substrate. When the prescribed solution reaches the one surface portion of the substrate, the thin film forming material contained in the solution decomposes thermally because the substrate has been heated to the prescribed temperature, thereby forming a thin film on the one surface portion of the substrate.

The thickness information generating means has prescribed information on thickness of a thin film to be formed on the one surface portion of the substrate, and the control means controls the spraying means based on the prescribed information from the thickness information generating means. Since the control means allows the spraying means to spray a prescribed solution on the basis of the prescribed information on thickness of a thin film to be formed on the one surface portion of a substrate, a thin film having a desired thickness is formed with high accuracy.

In the invention, the thin film forming apparatus further comprises removing means for removing from the housing space the solution which is sprayed by the spraying means and floats around the substrate inside the housing space.

According to the invention, by spraying the prescribed solution by the spraying means, an atomized solution is floating around the substrate inside the housing space, but the atomized solution around the substrate can be eliminated by the removing means. Therefore, this can prevent the atomized solution around the substrate that is not necessary for obtaining a thin film of a prescribed thickness from depositing the substrate, and a thin film having a desired thickness with higher accuracy.

In the invention, the thin film forming apparatus further comprises holding means for holding the thickness information generating means in such a manner as to be movable from an outside of the housing body into the housing space and also for holding the thickness information generating means housed in the housing space in such a manner as to be movable to the outside of the housing body.

According to the invention, the holding means moves the thickness information generating means from the outside of the housing body into the housing space and moves the thickness information generating means housed in the housing space to the outside of the housing body. While the prescribed solution is sprayed by the spraying means, moving the thickness information generating means to the outside of the housing body can prevent the prescribed solution atomized from depositing onto the thickness information generating means. Thus, the reliability of the prescribed information to be generated by the thickness information generating means will be increased. Also, with the thickness information generating means moved from the outside of the housing body into the housing space, the thickness information generating means generates the prescribed information on thickness of a thin film formed on the substrate. Thereby it is possible to obtain the prescribed information on the thickness of the thin film formed on the substrate without carrying the substrate to the outside of the housing body.

In the invention, the control means obtains information on thickness of a thin film to be formed on the one surface portion of the substrate through one spraying by the spraying means, and allows the spraying means to spray a prescribed number of times and thereafter, allows the spraying means to spray the solution containing the thin film forming material so that the thin film to be formed on the one surface portion of the substrate has the prescribed thickness, on the basis of the prescribed information from the thickness information generating means and the information on thickness of a thin film on the one surface portion of the substrate through one spraying by the spraying means.

According to the invention, the control means allows the spraying means to spray the prescribed solution on the basis of the information on the thickness of the thin film to be formed on the one surface portion of the substrate through one spraying and the prescribed information from the thickness information generating means. Thereby it is possible to form a thin film having a desired thickness with high accuracy. For instance, the control means determines the number of times for spraying the prescribed solution by the spraying means so that a thin film to be formed on the one surface portion of the substrate has a prescribed thickness, and based on this determination, allows the spraying means to spray the prescribed solution.

In the invention, the control means allows the spraying means to spray a prescribed number of times, calculates thickness information of a thin film to be formed on the one surface portion of the substrate through one spraying by the spraying means on the basis of the prescribed information from the thickness information generating means, and allows the spraying means to spray the solution containing the thin film forming material so that the thin film to be formed on the one surface portion of the substrate has the prescribed thickness, on the basis of the prescribed information obtained by the thickness information generating means and the calculated thickness information of the thin film to be formed on the one surface portion of the substrate through one spraying by the spraying means.

According to the invention, the control means calculates thickness information of a thin film to be formed through one spraying by the spraying means on the basis of the prescribed information obtained by the thickness information generating means. For instance, thickness information of the thin film to be formed through one spraying by the spraying means may be calculated on the basis of the prescribed information from the thickness information generating means and the number of times of spraying by the spraying means. Furthermore, for instance, thickness information of the thin film to be formed through one spraying by the spraying means may be calculated on the basis of the prescribed information from the thickness information generating means before and after spraying the prescribed solution once by the spraying means. In the apparatus, a thin film is formed by spraying a plurality of times, but by obtaining the thickness of the thin film formed through one spraying, it is possible to form a thin film having the prescribed thickness with high accuracy, by controlling the spraying means on the basis of the prescribed information from the thickness information generating means and the information on the thickness of the thin film to be formed through one spraying by the spraying means.

In the invention, the thickness information generating means generates color shading information on a thin film to be formed on the one surface portion of the substrate.

According to the invention, the thickness information generating means generates color shading information on a thin film to be formed on the one surface portion of the substrate. In a case where thickness of a thin film changes, color shading of a thin film changes due to a change of component of light reflected by the thin film. Namely, by generating color shading information on a thin film, the thickness of the thin film can be learned from the color shading information on the thin film. In order to generate such color shading information on the thin film, the thickness information generating means can be composed of a color image sensor or the like, which is realized at low cost.

In the invention, the thickness information generating means produces spectral reflectivity of a thin film to be formed on the one surface portion of the substrate.

According to the invention, the thickness information generating means produces spectral reflectivity of a thin film to be formed on the one surface portion of the substrate. In a case where thickness of a thin film changes, spectral reflectivity to be produced by the thickness information generating means changes due to a change of component of light reflected by a thin film. Namely, the thickness of the thin film can be learned from spectral reflectivity. By using spectral reflectivity, the thickness of the thin film can be obtained with high accuracy.

The invention provides a thin film forming apparatus comprising:

material solution spraying means for emitting a jet of a mixture of a carrier gas and a material solution containing a thin film material and an organic solvent and spraying liquid droplets of the material solution onto a surface of a plate-like substrate;

spraying control means for controlling spraying quantity of the liquid droplets of the material solution;

substrate heating means for heating the plate-like substrate; and exhausting means for exhausting the carrier gas and a gas produced by the evaporation of the organic solvent, the substrate heating means including:

heating means for heating the plate-like substrate;

temperature detecting means for detecting temperature distribution of the plate-like substrate;

temperature control means for controlling an operation of the heating means so that the plate-like substrate has a predetermined temperature distribution in accordance with the spraying quantity of the material solution per unit area in the plate-like substrate based on the detection result of the temperature detecting means; and holding means for holding at least the plate-like substrate and the heating means.

According to the invention, by using such a thin film forming apparatus of the invention, even in a case where the material solution spraying means is a spray nozzle, it is possible to form a thin film of a uniform thickness on the entire surface of the plate-like substrate, without being affected by the structural characteristics of the spray nozzle. Accordingly, the thin film forming apparatus of the invention can be preferably used for forming thin films in general, especially for antireflection films and the like.

According to a study by the inventors, it has been revealed that in a spray pyrolysis deposition technique, a thin film forming rate depends on the surface temperature of the plate-like substrate. Namely, the surface temperature of the plate-like substrate is directly proportional to the thin film forming rate, and as the temperature increases, the thin film forming rate increases and the quantity of a thin film to be formed also increases. In a conventional thin film forming apparatus, heating means such as a heater is fixed at the central part of the surface of a stage for holding the plate-like substrate by being unidirectionally incorporated. When the plate-like substrate is mounted on the stage, the central part of the plate-like substrate closer to the heating means has a higher temperature, and at an end part of the plate-like substrate which end part is disposed relatively far from the heating means, the temperature becomes lower than the central part due to ease of heat radiation. Therefore, in conventional thin film forming apparatuses, it is very difficult to control the entire surface of the plate-like substrate at substantially the same temperature. In addition to this, since the spraying quantity of a material solution varies locally due to the structural characteristics of the spraying means, a thin film to be formed on the plate-like substrate has such a mound shape that its central part is elevated perpendicularly to the surface of the plate-like substrate and its end part has a thin thickness. On the contrary, in the invention, by heating the plate-like substrate so as to have temperature distribution corresponding to the spraying quantity of the material solution, a thin film having a uniform thickness can be formed on the entire surface of the plate-like substrate.

Furthermore, according to the invention, in the aforementioned substrate heating means by arranging heat conduction means between the plate-like substrate and the heating means, not by directly heating the plate-like substrate by the heating means, but by heating via heat conduction means, the temperature control of the entire surface of the plate-like substrate can be realized more easily. Accordingly, a thin film having a uniform thickness can be formed much more easily.

In the invention, the heating means heats the plate-like substrate so that the plate-like substrate has temperature distribution approximately inversely proportional to the spraying quantity per unit area of the material solution in the plate-like substrate surface.

According to the invention, in heating the plate-like substrate so as to have temperature distribution according to the spraying quantity per unit area of the material solution in the plate-like substrate surface, heating is made in such a manner as to be approximately inversely proportional to the spraying quantity, and thereby a thin film can be formed with the uniformity of film thickness further improved. More specifically, for instance, the plate-like substrate may be heated so that the temperature of the central part of the substrate where the spraying quantity is large is relatively low as compared with that of the end parts of the plate-like substrate where the spraying quantity is small.

In the invention, the heating means comprises a heat source having a substantially annular shape in a plan view thereof.

According to the invention, in the aforementioned heat means, by using the heat source having the substantially annular shape, the temperature control can be realized easily with higher accuracy so as to make the temperature of the end parts of the plate-like substrate where the spraying quantity of the material solution is relatively small, higher than that of the central part of the plate-like substrate where the spraying quantity is relatively large. Further, since such a heat source having the substantially annular shape is not structurally complex and is simple in structure, it can be realized at less cost, which is advantageous industrially.

In the invention, the heating means comprises a plurality of the heat sources having a substantially annular shape in a plan view thereof, which are concentrically arranged.

According to the invention, in the aforementioned heating means, by concentrically arranging the plurality of heat sources having the substantially annular shape the temperature control of the plate-like substrate can be realized more accurately, and accordingly, the thickness of the thin film to be formed can be more uniform.

BRIEF DESCRIPTION OF THE DRAWINGS

Other and further objects, features, and advantages of the invention will be more explicit from the following detailed description taken with reference to the drawings wherein:

FIG. 8 is a flow chart showing the processing operation of a main control section for forming a thin film having a prescribed thickness in the thin film forming apparatus;

FIG. 9 is a flow chart showing the processing operation of the main control section for forming a thin film having a prescribed thickness in the thin film forming apparatus;

FIG. 10 is a flow chart showing the processing operation of a main control section for forming a thin film having a prescribed thickness in a thin film forming apparatus according to a third embodiment of the invention;

FIG. 11 is a flow chart showing the processing operation of the main control section for forming a thin film having a prescribed thickness in the thin film forming apparatus according to the third embodiment of the invention;

DETAILED DESCRIPTION

Figure 1:
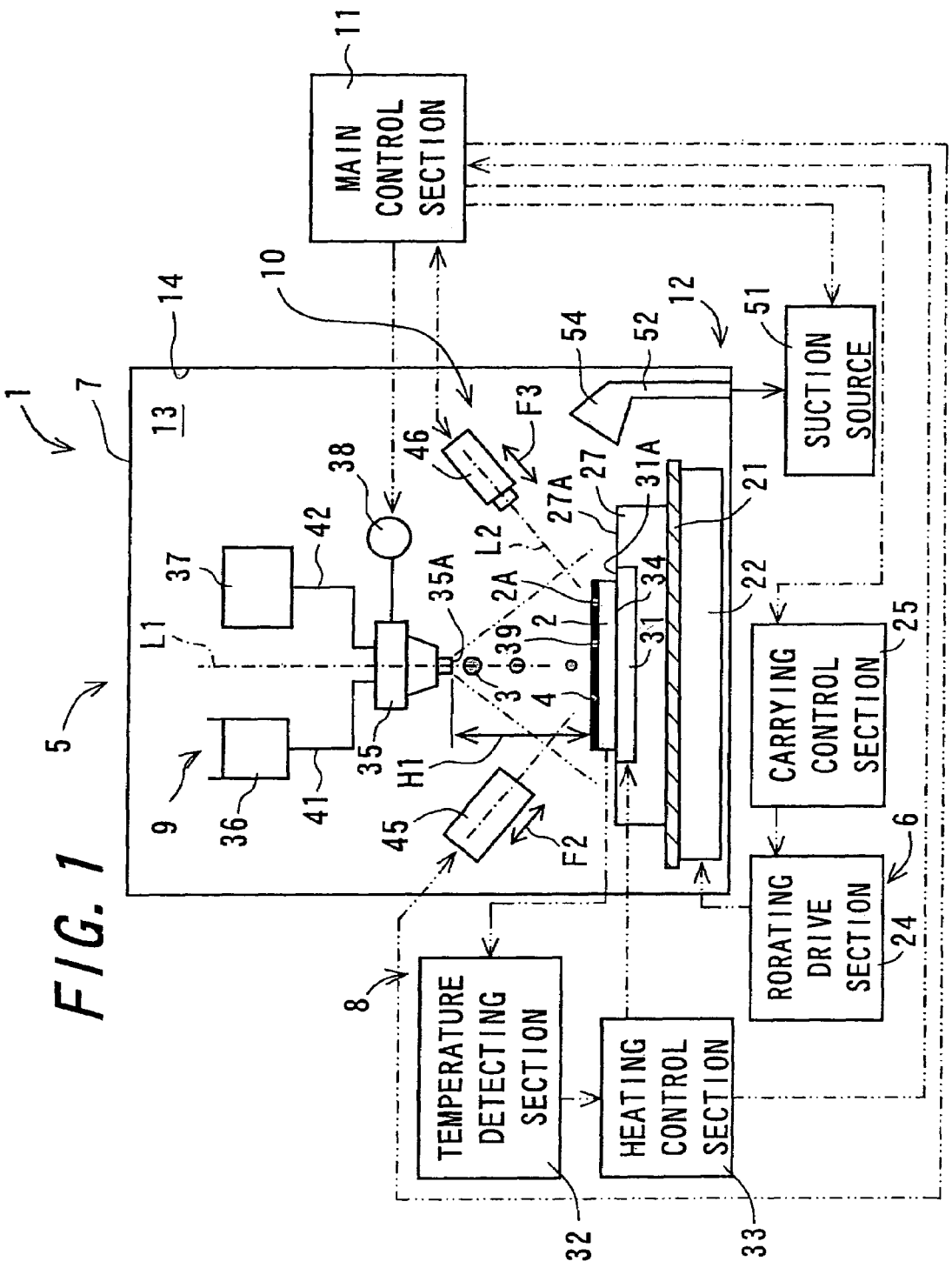
FIG. 1 is a drawing showing schematically the constitution of a thin film forming apparatus according to a first embodiment of the invention.

Now referring to the drawings, preferred embodiments of the invention are described below.

Figure 2:
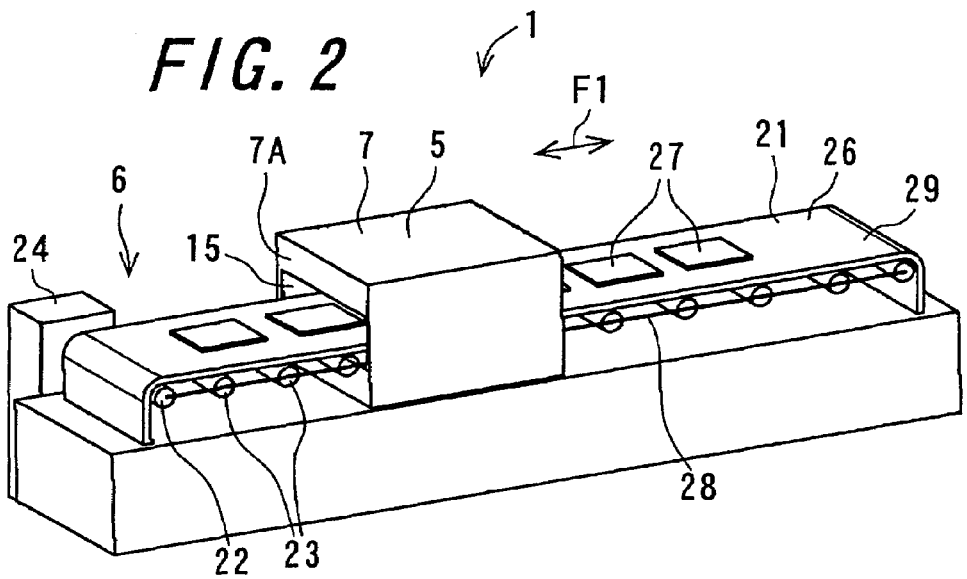
FIG. 2 is a perspective view showing the appearance of the thin film forming apparatus.

FIG. 1 shows schematically the constitution of a thin film forming apparatus 1 according to a first embodiment of the invention. FIG. 2 is a perspective view showing the appearance of a thin film forming apparatus. Furthermore, in FIG. 1, a substrate 2 to be processed by the thin film forming apparatus 1 is also shown. The thin film forming apparatus 1 can form a thin film 4 having a desired thickness on a surface 2A of the substrate by spraying a prescribed solution 3 containing a thin film forming material a plurality of times on the substrate heated. The substrate on which a thin film is to be formed is, for instance, a glass substrate, having a rectangular plate-like. In this embodiment, the thin film 4 having a desired thickness can be formed by applying a plurality of thin film coatings.

The thin film forming apparatus 1 comprises a main unit 5 of the thin film forming apparatus and carrying means 6 for carrying substrates 2. The substrate on which a thin film is to be formed is carried by the carrying means 6 to the main unit 5 of the thin film forming apparatus, by which main unit 5 a thin film 4 having a desired thickness is formed on a surface 2A of the substrate 2, and thereafter, the substrate 2 on which the thin film 4 with a desired thickness has been formed is carried out of the main unit 5 of the thin film forming apparatus.

The main unit 5 of the thin film forming apparatus comprises a housing body 7, heating means 8, spraying means f9, thickness information generating means 10, a main control section 11 and removing means 12. In the housing body 7, a housing space 13 is formed for housing the substrate 2. The housing space 13 is a substantially closed space. The housing body 7 has an internal surface 14 in the shape of a substantially rectangular pararellelepiped. The region enclosed by this internal surface is the housing space 13. In the housing body 7, an opening 15 is formed for the communicative connection between the housing space 13 and the outside of the housing body 7. The opening 15 is formed on a side wall 7A of the housing body 7. By forming the opening 15, the substrate 2 can be housed inside the housing space 13 through the opening 15, and the substrate 2 inside the housing space 13 can also be removed out of the housing body 7 toward the outside.

The carrying means 6 carries a substrate 2 in the housing space 13 through the opening 15 of the housing body 7 and put the substrate 2 in a prescribed position where the substrate 2 is to be processed for allowing it to be housed in the housing space 13, and thereafter the substrate 2 put in place is carried out of the housing body 7 through the opening 15. In this embodiment, the carrying means 6 carries the substrate 2 in one of the prescribed carrying directions F1. In the housing body 7, two openings 15 are formed, through one opening 15 of which the substrate 2 is carried in the housing space 13 and through the other opening of which the substrate 2 is carried out of.

The carrying means 6 is realized by a belt conveyor unit in this embodiment. The carrying means 6 comprises a moving part 21, a driving roller 22, a plurality of driven rollers 23, a rotating drive section 24 and a carrying control section 25. The moving part 21 has a belt 26 and a substrate holder 27 provided on this belt 26. The belt 26 is an endless circular type, and is realized by, for instance, a high-temperature mesh belt for high temperature use made by Taiyo Wire Cloth Co., Ltd.

The substrate holder 27 is a mounting board for holding a substrate 2. The substrate holder 27 holds a heater 31 of heating means 8 described hereinbelow. The substrate 2 is mounted on the heater 31 to be held in the substrate holder 27. A mounting surface 27A for holding the heater 31 of the substrate holder 27 is formed to be greater than the substrate 2. A number of the substrate holders 27 are arranged on the external circumferential surfaces of the belt 26 in certain intervals. The substrate holder 27 is made of, for instance, ceramic materials such as alumina. The prescribed distance between adjacent substrate holders 27 is selected in such a manner that when one substrate holder 27 is housed in the housing body 7, then other substrate holders 27 are arranged to be outside the housing body 7.

The belt 26 is rolled onto the driving roller 22 and a number of driven rollers 23. The rotation axis line of the driving roller 22 and the driven rollers 23 is placed in the substantially horizontal direction, and in the upper carriage part of the belt 26 on which a substrate 2 is carried with the substrate held in the substrate holder 27, the mounting surface 27A of the substrate holder 27 moves horizontally. The both ends of the driving roller 22 and the driven rollers 23 in the rotation axis line are supported rotatably on a roller supporter 28. At least an upper carriage part 29 of the belt 26 on which a substrate 2 is carried with held by the substrate holder 27 is arranged by inserting through one opening and the other opening 15 of the housing body 7.

The driving roller 22 rotates around the rotation axis line by means of a torque provided by the rotating drive section 24.

The rotating drive section 24 is realized by, for instance, a motor. The rotating drive section 24 rotates based on a control command given from the carrying control section 25. By driving the rotating drive section 24, the driving roller 22 rotates around the rotation axis line, thereby moving the belt 26. With the moving of the belt 26, the driven rollers 23 rotate respectively around the rotation axis lines. The carrying control section 25 is realized by, for example, a micro-computer and drives the rotating drive section 24 by means of a control command given from a main control section 11 as described hereinbelow, to allow the substrate holder 27 to move the prescribed position inside the housing space 13 and to move the substrate holder 27 from the prescribed position to the outside of the housing body 7. By such a constitution, the carrying means 6 carries the substrates 2 in one direction to allow the substrates 2 one by one to house inside the housing spade 13 of the housing body 7, and that furthermore, unprocessed substrates 2 can be carried in the housing body 7 when the substrate 2 formed the thin film having a desired thickness by the thin film forming apparatus 5 is carried out of. Therefore, it is possible to carrying out a processing efficiently.

A heating means 8 heats a substrate to a prescribed temperature T1. The heating means 8 comprises a heater 31, a temperature detecting section 32 and a heating control section 33. The heater 31 is realized, for instance, a far-infrared ceramic heater made by Kawai Electric Heater Co., Ltd. The heater 31 is held by the substrate holder 27. One surface 31A of the heater 31 has a rectangular shape, and the substrate 2 is mounted on this surface 31A. The heater 31 heats the substrate 2 by making contact with the other surface 34 in the thickness direction of the substrate 2 mounted on the substrate holder 27. The one surface 31A of the heater 31 has a greater area than the other surface 34 in the thickness direction of the substrate 2.

The temperature detecting section 32 detects the temperature of the substrate 2. The temperature detecting section 32 is constructed of, for instance, including a thermocouple. The temperature detecting section 32 can detect the temperature of the substrate 2 by measuring an electromotive force generated in the thermocouple. To accurately measure the temperature of the substrate 2, the thermocouple is embedded in the circumference of the substrate 2, more specifically, at four sides of the rectangular substrate 2.

The heating control section 33 controls the heater 31, based upon a temperature detected by the temperature detecting section 32. That is, the heating control section 33 allows the heater 31 to heat a substrate 2 so that the temperature of the substrate 2 reaches a prescribed temperature T1 or stops heating the substrate 2 of the heater 31. When the temperature of the substrate 2 reaches the prescribed temperature T1, then it is considered that the temperature of one surface portion 2A of the substrate 2 has reached the prescribed temperature T1. By controlling the heater 31 by means of the heating control section 33, the substrate 2 can be heated to a prescribed temperature T1. The prescribed temperature T1 is selected to be, for instance, from 400 degrees C. to 500 degrees C. In case the prescribed temperature T1 is not more than 400 degrees C., there are some problems: the film formed may produce foams or bubbles and/or the nonuniformity in film thickness may be increased. In case the prescribed temperature T1 is more than 500 degrees C., then problems will be raised that the solution may be thermally decomposed in the process of spraying and may deposit in a powdery state on the substrate 2, and the power consumption of the heat source may be increased. When the prescribed temperature T1 falls in the preceding temperature range, a homogeneous and flat thin film with no pinholes on the formed film can be obtained.

The heating control section 33 is realized, for instance, by a microcomputer. The heating control section 33, when a control command is given from a main control section 11 as described hereinbelow, controls the heater 31 for heating the substrate 2 to a prescribed temperature, and when the substrate 2 is considered to have been heated to the prescribed temperature T1, sends to the main control section 11 a prescribed signal showing that this substrate has been heated to the prescribed temperature T1.

Spraying means 9 sprays a prescribed solution 3 comprising a thin film forming material on a substrate 2 to be housed in the housing space 13. The spraying means 9 sprays the prescribed solution 3 on the substrate 2 heated to the prescribed temperature by the heating means 8, thereby changing the prescribed-solution 3 from liquid to solid phase on the one surface portion 2A of the substrate 2, and more specifically, the solvent of the prescribed solution 3 evaporates to form a thin film through a thermal decomposition reaction of the thin film forming material serving as a precursor.

The spraying-means 9 comprises a spray nozzle portion 35, a solution supplier 36 for supplying a prescribed solution 3 to the spray nozzle portion 35, a carrier gas supplier 37 for supplying a carrier gas to a spray nozzle portion 35 and a valve section 38 for spraying the prescribed solution 3 from the spray nozzle portion 35 and stopping spraying the prescribed solution 3 from the spray nozzle portion 35 according to a control command from the main control section 11. The spraying means 9 is placed within the housing space 13 in this embodiment, but a part of the spraying means 9, for instance, such as the solution supplier 36 and the carrier gas supplier 37, may be arranged outside the housing body 7.

The spray nozzle portion 35 is realized by a binary fluid nozzle. For the spray nozzle, for instance, a spray gun STA-6R having a nozzle orifice of 0.5 mm, manufactured by Fuso Seiki Co., Ltd. is used. From the solution supplier 36, a prescribed solution 3 is supplied, at the fluid pressure of 0.5 Mega Pascal (MPa), for instance, and from the carrier gas supplier 37, a carrier gas is supplied at the gas pressure of 0.4 Mega Pascal (MPa), for instance. Also, the time for each spraying at the spray nozzle portion 35 is selected to be, for instance, 0.5 seconds.

The spray nozzle portion 35 is fixed to the housing body 7, and a spray outlet 35A for spraying a prescribed solution 3 is arranged downward. More specifically, the spray outlet 35A faces a substrate holder 27 to be arranged in the prescribed processing position by the carrying means 6. The center axis line L1 passing through the center of the spray outlet 35A of the spray nozzle portion 35 passes through the center of a substrate 2 to be arranged in the prescribed processing position. The distance H1 between the end face of the spray outlet 35A of the spray nozzle portion 35 and one surface 39 of the substrate 2 to be arranged in the prescribed processing position is selected to be, for instance, from 30 cm to 70 cm. In case the distance H1 becomes smaller than 30 cm, then the area to be coated becomes smaller. Furthermore, the distance H1 is longer than 70 cm, a thin film cannot be formed due to a thermal decomposition of the solution in the course of the spraying process.

The solution supplier 36 comprises a solution container for containing a prescribed solution 3. The prescribed solution 3 is contained in this solution container. The solution supplier 36 supplies the prescribed 3 to the spray nozzle portion 35 via a solution supply line 41. The carrier gas supplier 37 includes a gas filling cylinder to fill a carrier gas. In this gas filling cylinder, a carrier gas is filled. The carrier gas supplier 37 supplies a prescribed gas to the spray nozzle portion 35 via the gas supply line 42.

The prescribed solution 3 includes a thin film forming material. The thin film forming material comprises, for instance, titanium alcoxides, such as titanium tetra-I-propoxide, titanium tetra-N-propoxide, titanium tetra-N-butoxide and titanium tetra-I-butoxide. By using such prescribed solution 3, a thin film composed of titanium oxide serving as a photocatalyst can be formed on the one surface portion 2A of a substrate 2. The prescribed solution 3 is prepared by diluting the thin film forming material with a prescribed solvent. The prescribed solvent 3 is, for instance, such as an organic solvent. The organic solvent comprises, for instance, such as isopropyl alcohol (abbreviated to IPA) and ethanol. The concentration of the thin film forming material in the prescribed solution 3 is selected to be, for instance, from 1.0 wt % to 5.0 wt %, preferably, 3.0 wt %. In the case of smaller concentration than the lower limit value of the concentration, a film to be formed will become thinner and as a result, the number of times needed for spraying the prescribed solution 3 by the spraying means 9 will be increased, thereby requiring longer forming time. In the case of larger concentration than the upper limit value of the concentration, a film to be formed cannot have an even thickness, hence nonuniformity in film thickness.

The prescribed gas is realized by, for instance, such as nitrogen gas ($N_2$), air, helium (He) gas and argon (Ar) gas. As a prescribed gas, air may be used as described hereinbefore, but it is more desirable to use an inert gas, such as nitrogen gas, helium gas and argon gas. The carrier gas is filled in a cylinder in the compressed state. In the case of using air as a carrier gas, the carrier gas supplier 37 may be realized by means of, for instance, an air compressor.

The spray nozzle portion 35 atomizes the prescribed solution 3 supplied from the solution supplier 36 by means of the prescribed gas supplied from the carrier gas supplier 37 and blow it off through a spray outlet 35A. The spray nozzle portion 35 sprays the prescribed solution 3 which has been atomized onto a substrate 2 at a given flow rate. The spray nozzle portion 35 sprays the prescribed solution at a given flow rate. Heating the substrate 2 by the heating means 8 described hereinbefore causes an updraft above the substrate 2. The flow rate of the prescribed solution 3 to be sprayed from the spray nozzle portion 35 is determined so that the prescribed solution 3 subjected to atomization can reach the substrate 2 without diffusion, by means of this updraft taking place above the substrate 2. The predetermined flow rate is selected to be in the range so that a liquid droplet of the prescribed solution 3 subjected to atomization reaching one of the surface 2A of a substrate 2 has a diameter in the order of several tens of micrometers to 100 micrometers ($\mu$m). In the case of smaller size of a coating liquid droplet than several tens of micrometers, a problem will be raised that the spraying solution will change to powdery state due to thermal decomposition enhanced in the course of spraying, thus resulting in failure of a film formation. Another problem is that in the case of larger size of the coating liquid droplet than 100 micrometers ($\mu$m), a film to be formed will have an uneven thickness, or causing nonuniformity in film thickness. The size of the coating liquid droplet falling in the preceding range allows a thin film to be formed without coating inconsistency, resulting in achieving the conformity in film thickness.

The flow rate is set according to the spray nozzle portion 35 so that the diameter of a liquid droplet of the prescribed solution 3 subjected to atomization reaching the one surface portion 2A of the substrate 2 falls in the range in the order of several tens of micrometers to 100 micrometers, and in the case of using, for instance, the spray gun STA-6R manufactured by Fuso Seiki Co., Ltd., the flow rate is selected to be 2 milliliters per second (2 ml/sec).

The valve section 38 is realized by, for instance, a solenoid valve. The valve section 38 allows the spray nozzle portion 35 to spray the prescribed solution 3 based upon a control command from the main control section 11 or to stop spraying the prescribed solution 3. In the case of the spray gun STA-6R manufactured by Fuso Seiki Co., Ltd., as the spray gun has a built-in valve, when an air pressure of 0.5 Mega Pascal (MPa) is applied, a piston incorporated in the spray gun will operate to ON position; that is, the line will communicate.

The thickness information generating means 10 produces prescribed pieces of information on thickness of a thin film to be formed on the one surface portion 2A of a substrate 2 by means of thermal decomposition reaction of a thin film forming material. The thickness information generating means 10 comprises a lighting section 45 and an imaging section 46. The lighting section 45 is arranged inside the housing space 13 and is fixed in the prescribed position. The lighting section illuminates a substrate 2 held on the substrate holder 27 to be arranged in the prescribed position by the carrying means 6. The lighting section 45 is realized by, for instance, a fluorescent light. In the case of the lighting section 45 implemented by a fluorescent light, it is preferred that this fluorescent light is driven at high frequency by means of high frequency inverter control in order to reduce the influences that changes in brightness of this fluorescent light may have on the prescribed information on the thickness of a thin film. The lighting section 45, provided with a polarizing plate, illuminates the substrate 2 via the polarizing plate.

The imaging section 46 produces light and shade color information of a thin film to be formed on the one surface portion 2A of a substrate 2. In this embodiment, the imaging section 46 is realized by an imaging pickup device for imaging in color a thin film to be formed on the substrate 2, or to put it another way, by means of a color image sensor. The imaging section 46 has a polarizing plate, through which incoming light is received. The provision of the polarizing plate can prevent disturbance light from exerting influences on the light and shade color information on a thin film produced by this imaging section 46. The color image sensor is a color image sensor of three-plate type, comprising, for example, an imaging ring, a spectroscope for dispersing light to be obtained via the imaging lens into the components of red, blue and green, a light-sensitive element and a charge coupled device (abbreviated to CCD) corresponding to the light dispersed by the spectroscope. In this embodiment, the imaging section is realized by a three-plate type imaging sensor, but may be realized by a single plate type color image sensor equipped with color filters in red, blue and green. The imaging section 46 images the full region of a thin film to be formed on the one surface portion 2A of the substrate 2.

The light section 45 and the imaging section 46 are arranged in such a manner that the direction of radiation F2 of light from the lighting section 45 and the direction in which the optical axis L2 of an imaging lens of the imaging section 46 forms plane symmetry with respect to one virtual plane at right angles to the substrate 2. The direction of radiation F2 of light from the lighting section 45 and the direction F3 in which the optical axis L2 of an imaging lens of the imaging section 46 are inclined at a predetermined degree angle against a horizontal plane. The predetermined angle is selected to be in the range of, for instance, 30 degrees to 80 degrees. In this embodiment, the virtual plane is arranged vertically against the carrying direction F1. The lighting section 45 and the imaging section 46 are arranged respectively in the position saved from above to the side of the substrate 2 to be arranged in a prescribed position for processing. This allows the prescribed solution 3 subjected to spraying, when sprayed by the spraying means 9, to reach the substrate 2 without meeting any obstruction by way of the lighting section 45 and imaging section 46.

The light and shade color information produced by the imaging section 46 is given to the main control section 11. The light and shade color information means specifically information showing a brightness of any of the colors: red, blue and green subject to by the imaging section 46.

The main control section 11 allows the spraying means 9 to spray a prescribed solution 3 so that a thin film to be formed on the one surface portion 2A of a substrate 2 has a prescribed thickness, based upon the prescribed light and shade color information that is the prescribed information from the imaging section 46. The main control section 11 comprises a central processing unit (abbreviated to CPU), a memory part for storing a predetermined control program and a timer part for clocking time. The CPU executes a control program stored in the memory part, thereby controlling the spraying means 9, the heating means 8, the carrying means 6 and a suction source 51 as described hereinbelow, Specifically, the main control section 11 allows the line passage of a solution supply line 41 and a gas supply line 42 with the spray nozzle portion 35 to close or open, by providing a control command to the valve section 38 of the spraying means 9. The main control section 11 comprises control means.

Also, the main control section 11 assumes the thickness of a thin film formed on the one surface portion 2A of a substrate 2, from the prescribed light and shade color information that is the prescribed information given by the thickness information generating means 10. This principle is described hereinbelow. Repeating the spraying of a prescribed solution 3 will increase the thickness of a thin film formed on the one surface portion 2A of a substrate 2. The increase in thickness will result in varying a light reflectance on the substrate 2 with a thin film formed, depending on interference effects between light reflected on the surface of the thin film and light reflected on the one surface 39 of the substrate 2, out of light illuminated from the lighting section 45.

Figure 3:
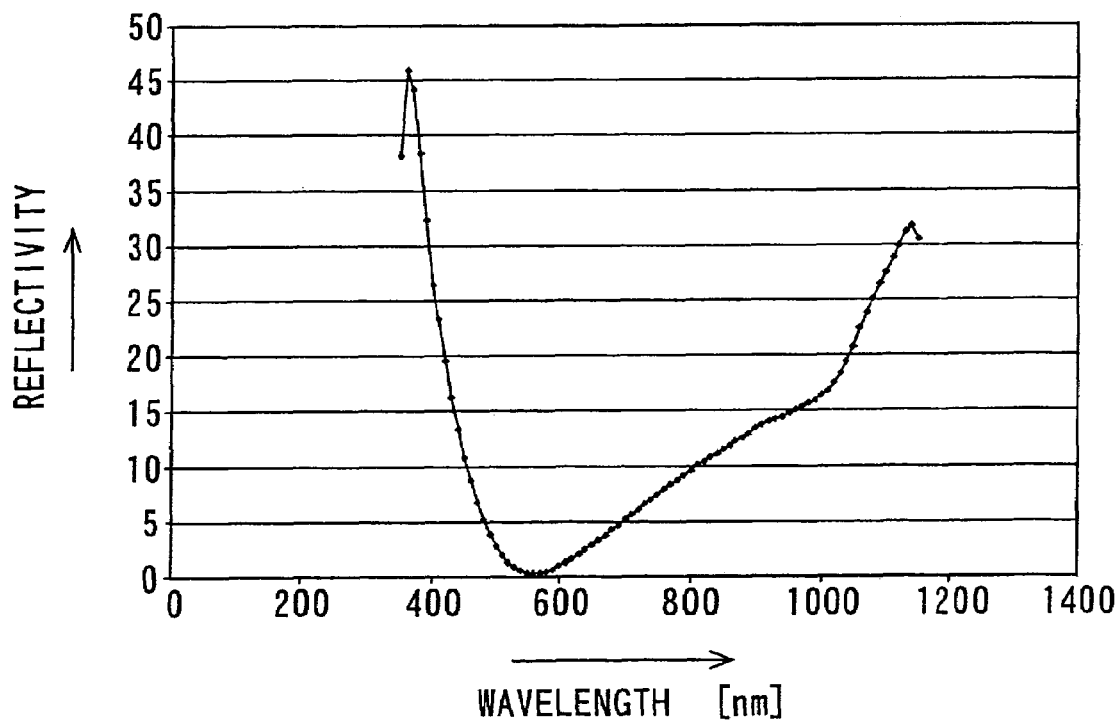
FIG. 3 is a drawing showing graphically an example of reflectivity characteristics of a thin film formed on one surface portion of a substrate.

FIG. 3 is a graphical representation showing reflectance characteristics of a thin film formed on the one surface portion 2A of a substrate 2. In a graph as shown in FIG. 3, the horizontal axis shows a wavelength and the vertical axis shows a reflectance. If the light refractive index of a thin film formed on the one surface portion 2A of a substrate 2 is expressed by n, the thickness of the thin film is expressed by h and assuming that the wavelength of incident light λ has a minimum reflectance as expressed by the following equation (1), the reflectance of light having a given wavelength as shown in the graph FIG. 3 will be lowered as compared with that having a different wavelength. As a result, when the reflectance is plotted over each wavelength in the graph, then the reflectance characteristics will be obtained in such a manner that the solid line assumes a substantially concave shape is made by the solid line connecting each reflectance of light having wavelength.

$$\lambda = 4nh \tag{1}$$

For instance, when a thin film formed by a prescribed solution 3 has a refraction index of 2.3 and thickness in the order of 450 Å, the wavelength of light having the lowest reflectance will be about 410 nm and the surface of the thin film will be observed to be yellow as a complementary color for the wavelength of 410 nm. Thereafter, there will be cases where the wavelength of light having the lowest reflectance is referred to as "absorption wavelength." For instance, in a similar fashion, when a thin film formed by a prescribed solution 3 has a refractive index of 2.3 and thickness in the order of 550 Å, the absorption wavelength will be about 500 nm and the surface of the thin film will be observed to be red. Furthermore, for instance, in a similar fashion a thin film formed by a prescribed solution 3 has a refractive index of 2.3 and thickness in the order of 650 Å, the adsorption wavelength will be about 600 nm and the surface of the thin film will be observed to be blue.

Therefore, the color image sensor, acting as the imaging section 46, generates the image information on a thin film formed on a substrate 2, that is, generates the light and shade color information on a thin film formed on a substrate 2, so that the main control 11 can assume approximate film thickness from the light and shade color information.

In the memory section, stored is the information on thickness of a thin film corresponding to the color brightness each of the colors: red, blue and green, which are obtained from the imaging 46. When the refractive index of a thin film formed by a prescribed solution 3 is 2.3 and a prescribed thickness of the thin film formed on a substrate 2 is 650 Å, it is judged that the prescribed film thickness has been secured when the prescribed brightness is obtained by calculating a blue brightness from the color image sensor and by referring to the information on the thickness corresponding to the blue brightness stored in the memory section. For instance, when the prescribed brightness is to be calculated, the brightness of each of the pixels of the color image sensor may be added and averaged.

The removing means 12 removes from the housing space 13, a prescribed solution 3 floating around the substrate 2 after being atomized inside the housing space 13 after being sprayed with by spraying means 9. The removing means 12 comprises a suction source 51, a suction line portion 52 and a main control section 11 for controlling the suction source 51. The suction source 51 sucks air inside the housing space 13 via the suction line portion 52 based on a control command from the main control section 11. This allows the prescribed solution 3 floating around the substrate 2 inside the housing space 13 to be removed from the housing space 13. The suction source 51 is realized by, for instance, a suction pump. The suction line portion 52 leads the suction force of the suction source 51 to the housing space 13. The suction line portion 52 comprises an opening 54 which opens on the side of a substrate 2 to be arranged in a prescribed position for processing so that the prescribed solution 3 floating after atomization is sucked from this opening 54. It is desired that such suction should allow the removing means 12 to lead a suction force to the place where the air flow of the housing space 13A is not turbulent. By removing by means of the removing means 12 from the housing space 13 what is not related to the thin film formation out of a prescribed solution 3 atomized, it is possible that excess solution of the prescribed solution 3 will be prevented from depositing on the substrate 2 and that a thin film to be formed will have a uniform thickness. In the case where prescribed information is generated by means of the thickness information generating means 10, this also prevents the atomizing prescribed solution 3 from causing a scattering of light from the lighting section 45 due to the atomizing prescribed solution 3, thereby allowing the main control section 11 to assume the thin film thickness with high accuracy.

Figure 4:
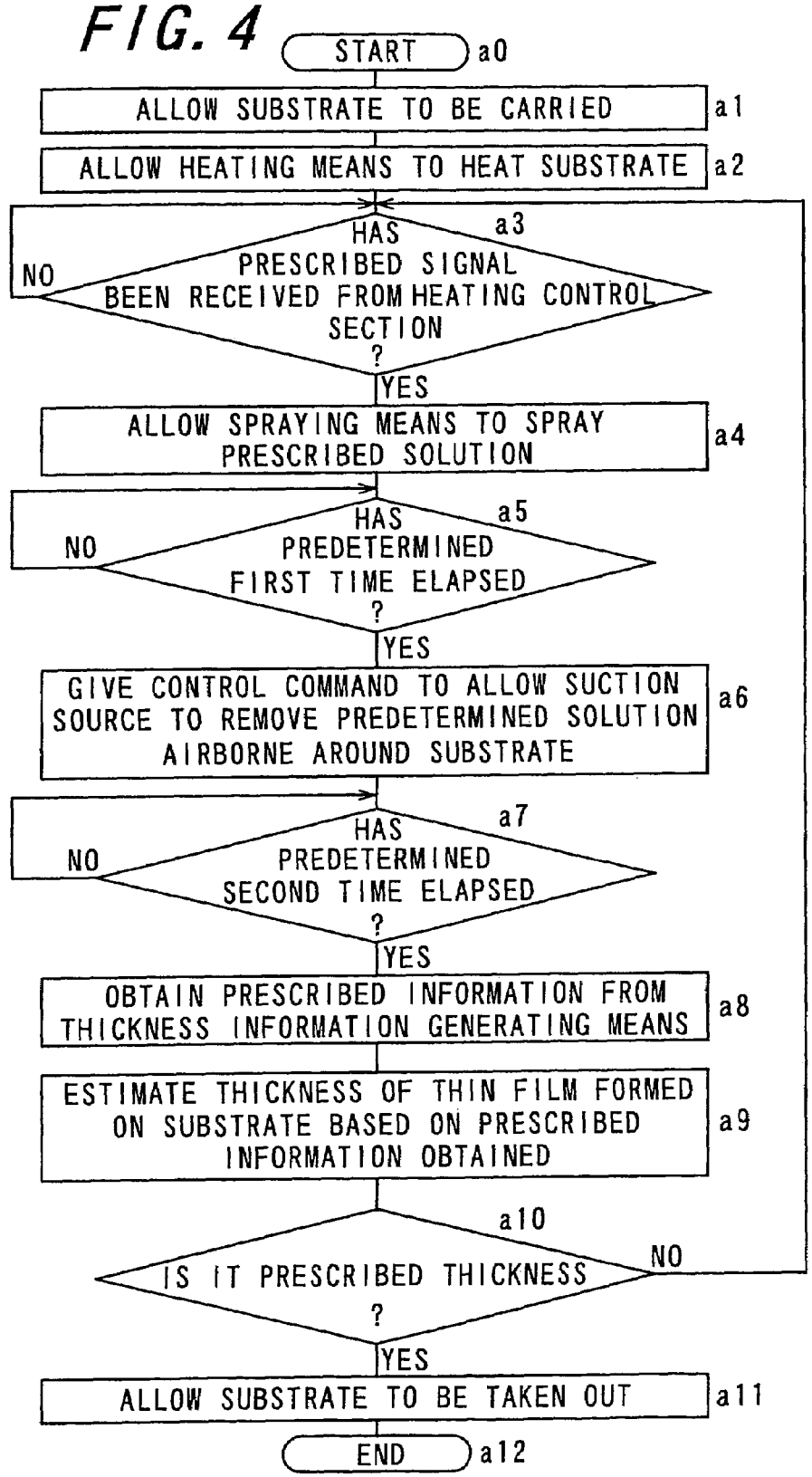
FIG. 4 is a flow chart showing the processing operation of a main control section.
Figure 5:
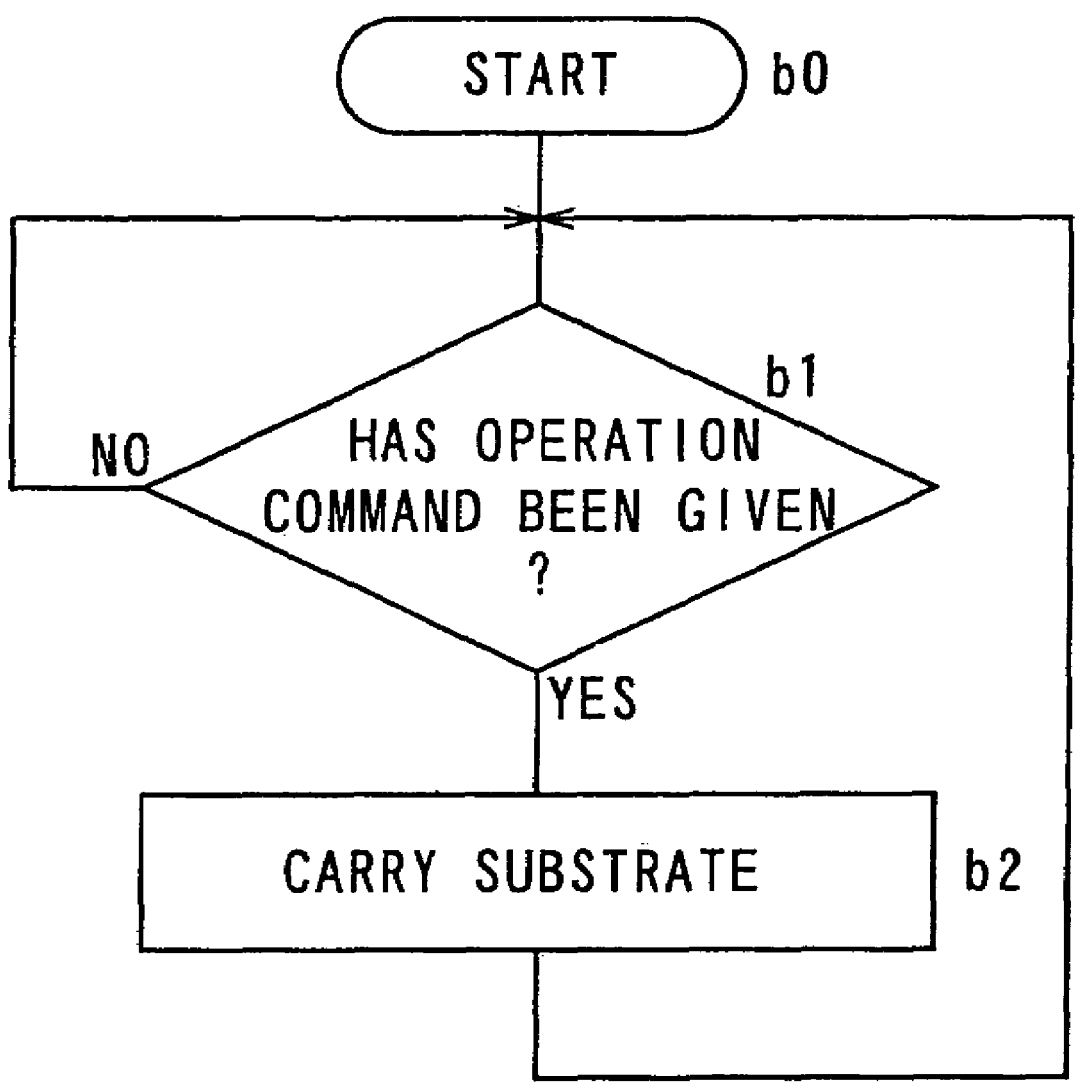
FIG. 5 is a flow chart showing the processing operation of a carrying control section.
Figure 6:
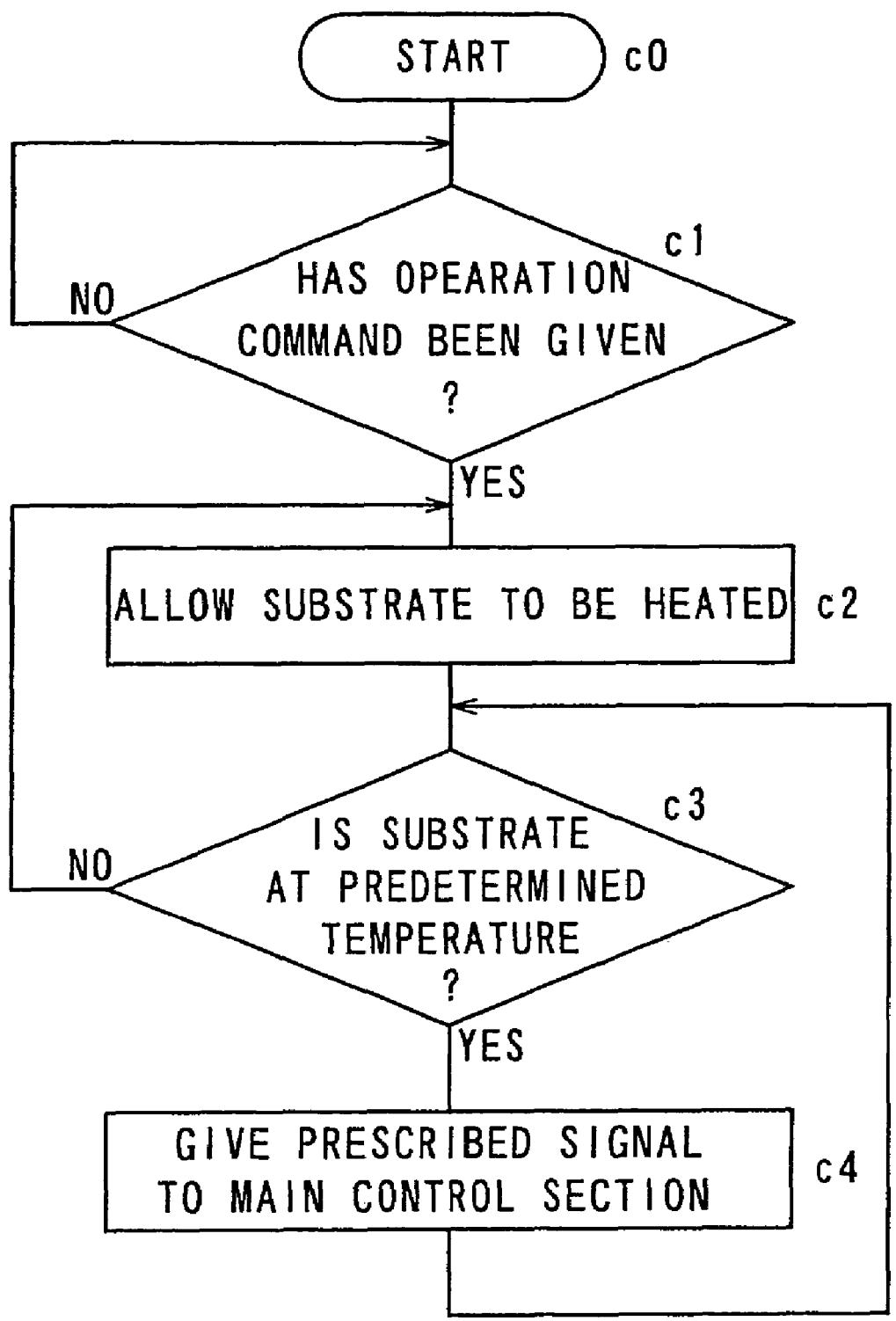
FIG. 6 is a flow chart showing the processing operation of a heating control section.

FIGS. 4, 5, and 6 show flowcharts showing processing operations for forming a thin film having a prescribed thickness in a thin film forming apparatus 1. FIG. 4 is a flowchart showing a processing operation of a main control section 11; FIG. 5 is a flowchart showing a processing operation of a carrying control section 25; and FIG. 6 is a flowchart showing a processing operation showing a heating control section 33. Hereto, a substrate 2 on which a thin film is to be formed is held on a substrate holder 27 on the upstream side of the carrying means 6 in the direction of carrying the substrate 2 outside the housing body 7. By operating a thin film forming apparatus 1, Step a0 will be shifted to Step a1 as shown in FIG. 4. At Step a1, a main control section 11 gives a control command to the carrying control section 25 of the carrying means 6 to allow a substrate 2 to be carried to the main body 5 of the thin film forming apparatus. This enables the substrate 2 on which a thin film is to be formed and held on the substrate holder 27 to be placed in a prescribed position for processing.

Next, Step a1 will be shifted to Step a2. At Step a2, the main control section 11 gives a control command to the heating control section 33 to allow the substrate 2 to be heated at a predetermined temperature. The heating control section 33 heats a heater 31 and when the substrate 2 reaches the predetermined temperature, gives to the main control section 11 a prescribed signal showing that the substrate 2 has reached the prescribed temperature T1.

Next, Step a2 will be shifted to Step a3. At Step a3, the main control section 11 judges whether or not the prescribed signal has been given from the heating control section 33. At Step a3, when the judgment is made that the prescribed signal has been given, Step a4 will be proceeded with, and when the judgment is made that the prescribed signal has not been given, then, Step a3 will be repeated at specific time intervals.

Further, at Step a4, the main control section 11 gives a control command to the valve section 38 for opening the line passage for a prescribed time. This allows the spraying means 9 to spray a prescribed solution 3. By means of processing at Step a3, the spraying means 9 apply one wisp of spray of a prescribed solution 3. In this embodiment, the volume of the prescribed solution 3 per wisp of spray from the spray nozzle portion 35 is selected to be 0.5 millimeters (ml) to 3 millimeters (ml). The prescribed solution 3 undergoes a thermal decomposition reaction on the one surface 39 of the heated substrate 2 to change from liquid to solid phase, thereby forming a thin film. For instance, when the temperature of a substrate 2 is 500 degrees C., MOFTi-3000-S produced by Tokyo Applied Chemistry is diluted with IPA as a prescribed solution 3 to prepare the concentration of MOFTi-3000-S produced by Tokyo Applied Chemistry to 35% by weight (wt %), and the prescribed solution 3 of 1 milliliter (ml) is sprayed by the spraying means 9, titanium oxide ($TiO_2$) 50 Å in thickness is formed on the one surface portion 2A of the substrate 2.

Next, Step a4 will be shifted to Step a5. At Step a5, the main control section 11 judges whether a first predetermined time t1 has elapsed or not after spraying by the spraying means 9 is finished, i.e., after the valve section 38 is closed. At Step a5, when the main control section 11 judges that the prescribed time t1 has elapsed, then Step a6 will be proceeded with, and when the main control section 11 judges that the prescribed time t1 has not elapsed, then Step a5 will be repeated. The prescribed time is selected to be the time for which the prescribed solution 3 to be deposited on the one surface portion 2A of a substrate 2 out of the prescribed solution 3 sprayed with by the spraying means 9 is deposited.

Next, Step a5 will be shifted to Step a6. At Step a6, the main control section 11 gives a control command to the suction source 51 to drive the suction source 51, and then Step a6 moves to Step a7. By receiving the control command, the suction source 51 exhausts the air of the housing space 13. This results in removing from the housing space 13 the prescribed solution floating around the substrate 2 after atomization. The suction source keeps running until the processing as shown at Step a10 is finished, and the suction source stops at the moment when the operation of Step a10 is finished.

Next, the procedure goes to Step a7 from Step a6. At Step a7, the main control section 11 judges whether a second predetermined time t2 has elapsed or not, after the suction source 51 is driven by means of a timer. At Step a7, when the main control section 11 judges that the second predetermined time t2 has elapsed, then the procedure goes to Step a8, and when the main control section 11 judges that the second predetermined time has not elapsed, then Step a7 will be repeated. The second predetermined time t2 is enough time for the prescribed solution 3 floating around the substrate 2 after atomization to be removed from the housing space.

Next, the procedure goes to Step a8 from a7. At Step a8, the main control section 11 obtains the prescribed information from the thickness information generating means 10. At Step a8, specifically, the main control section 11 gives the lighting section 45 a control command to cause this lighting section 45 to emit light and also gives the imaging section 46 a control command to drive the imaging section 46, thereby obtaining the prescribed information generated by the imaging section 46.

Next, the procedure goes to Step a9 from Step a8. At Step a9, the main control section 11, based on the prescribed information obtained at Step a7, assumes the thickness of a thin film formed on the one surface portion 2A of a substrate 2, and then Step a10 will be proceeded with.

At Step a10, it is judged whether the thin film thickness assumed at Step a9 reaches the prescribed thickness. When it is judged, at Step a9, that the prescribed thickness is attained, Step a11 will be proceeded with. When the prescribed thickness is not attained, then Step a03 will be resumed. When the prescribed solution 3 is sprayed on a substrate 2 heated at a prescribed temperature by the spraying means 9, the temperature of the substrate 2 will be lowered because of the deposition of the prescribed solution. However, by providing the processing of Step a3, the prescribed solution 3 is prevented from being sprayed with the lowered temperature of the substrate 2. This enables a thin film to be formed on the substrate 2 to have a uniform thickness.

At Step a11, the main control section 11 gives a control command to the carrying control section 25 of the carrying means 6 thereby carrying the substrate 2 out of the thin film forming apparatus main body 5. Then Step a12 will be taken to finish the processing. This results in taking out a substrate 2 held by the substrate holder 27, wherein the substrate has a prescribed thin film formed in the desired thickness.

FIG. 5 is a flow chart showing the processing operation of the carrying control section 25. When the power of the carrying control section 25 is turned on, Step b0 will be shifted to Step b1, where judgment is made whether or not an operation instruction has been given from the main control section 11. When the operation instruction is judged to have been given from the main control section 11, then the procedure goes to Step b2. When the operation instruction is not judged to have been given from the main control section 11, then Step b1 will be repeated.

At Step b2, by driving the rotating drive section 24, the substrate 2 held in the substrate holder 27 arranged outside the housing body 7 and located most adjacent to the housing body 7 on the upstream side in the carrying direction F1 is carried to a prescribed position for processing. The carrying control section 25 finishes turning off the power.

FIG. 6 is a flow chart showing the processing operation of the heating control section 33. The heating control section 33 takes steps c0 through c1 when the power is turned on. At Step c1, judgment is made whether or not an operation instruction has been given from the main control section 11. At Step c1, when the operation instruction is judged to have been given from the main control section 11, then the procedure goes to Step c2. When the operation instruction is judged not to have been from the main control section 11, Step c1 will be repeated.

At step c2, the heater 31 is controlled to heat a substrate 2. Then the procedure goes to Step c3. At Step c3, it is judged whether or not the temperature detected by the temperature detecting section 32 is a prescribed temperature T1, that is, whether or not the substrate 2 reaches a prescribed temperature T1. When the substrate 2 is judged to have reached a prescribed temperature T1 at Step c3, then, the procedure goes to Step c4. When the substrate 2 is judged not to have reached the prescribed temperature T1, then the procedure goes to Step c2 at Step c3.

At Step c4, the main control section 11 is given a prescribed signal showing that the substrate 2 reaches the prescribed temperature T1. Then the procedure goes to Step c3. The heating control section 33 finishes processing with the power turned off.

As described hereinabove, in the thin film forming apparatus 1, while detecting the thickness of the thin film formed on the one surface portion 2A of the substrate 2, the main control section 11 allows the spraying means 9 to spray with a prescribed solution 3, thereby forming, with high accuracy, a thin film having a prescribed thickness.

In this embodiment, the substrate 2 on which a thin film is to be formed has the geometry of a rectangular plate, but may have the geometry of a circular disc. A thin film 4 having the prescribed thickness can be formed on a substrate 2 having such a geometry.

In this embodiment, the carrying means 6 is realized by a belt conveyor unit. The carrying means 6 is not limited to this and may be, for instance, a carrying unit of moving-walk type.

The thickness information generating means 10 comprises a lighting section 45 and an imaging section 46, but, in place of the imaging section 46, spectroreflectometer for measuring a spectral reflectance may be used. In this case, as shown in FIG. 3 mentioned above, the main control section 11 can assume the thickness of a thin film formed on a substrate 2 on the basis of an absorbed wavelength having the lowest reflectance, by measuring spectral reflectance characteristics. In this case, the lighting section 45 is required to be a lighting unit suited for a spectroreflectometer. In this case, the lighting section 45 is realized by means of, for instance, a light emitting diode (abbreviated to LED) illumination. Also, the spectroreflectometer is averaged by measuring a spectra reflectance of a part of the substrate 2 on which a thin film is formed.

The thickness of a thin film using a spectroreflectometer, is calculated by the equation (2) in case where the lowest wavelength of the incident light when measured by use of a spectroreflectometer is λ, the refraction index of the thin film formed is n, and the thickness of a thin film is d.

$$d = \lambda/4n \qquad (2)$$

However, the formation of the above equation (2) is limited to the case where a thin film formed is a single layer and the light refraction index of the thin film to be formed is between that of air and that of the substrate. By using a spectroreflectometer for the thickness information generating means, a more accurate thickness of a thin film formed can be assumed by a main control section 11, and thereby, a thin film 4 having a prescribed thickness with high accuracy can be formed.

Figure 7A:
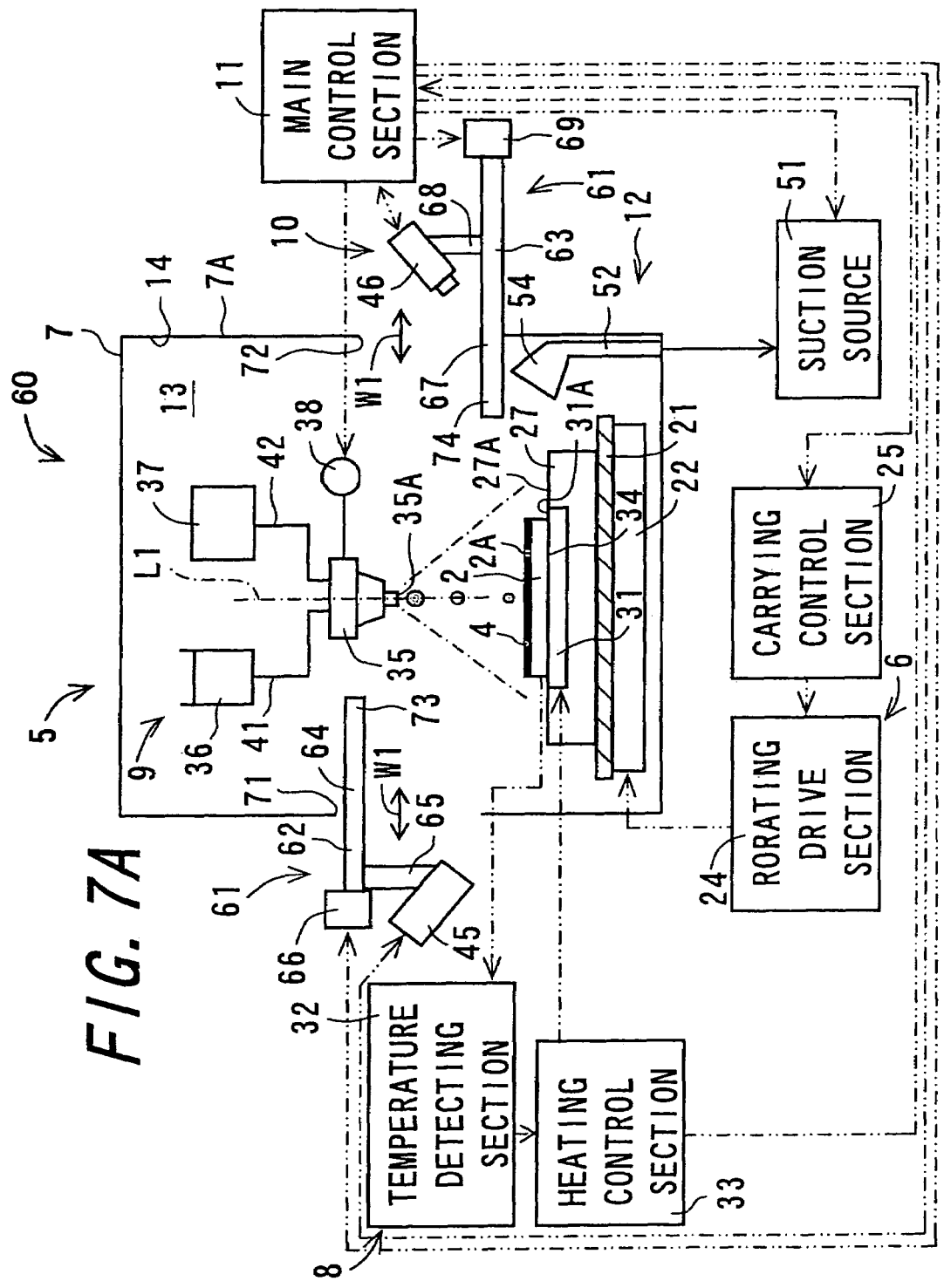
FIGS. 7A and 7B are views showing schematically the constitution of a thin film forming apparatus according to a second embodiment of the invention.
Figure 7B:
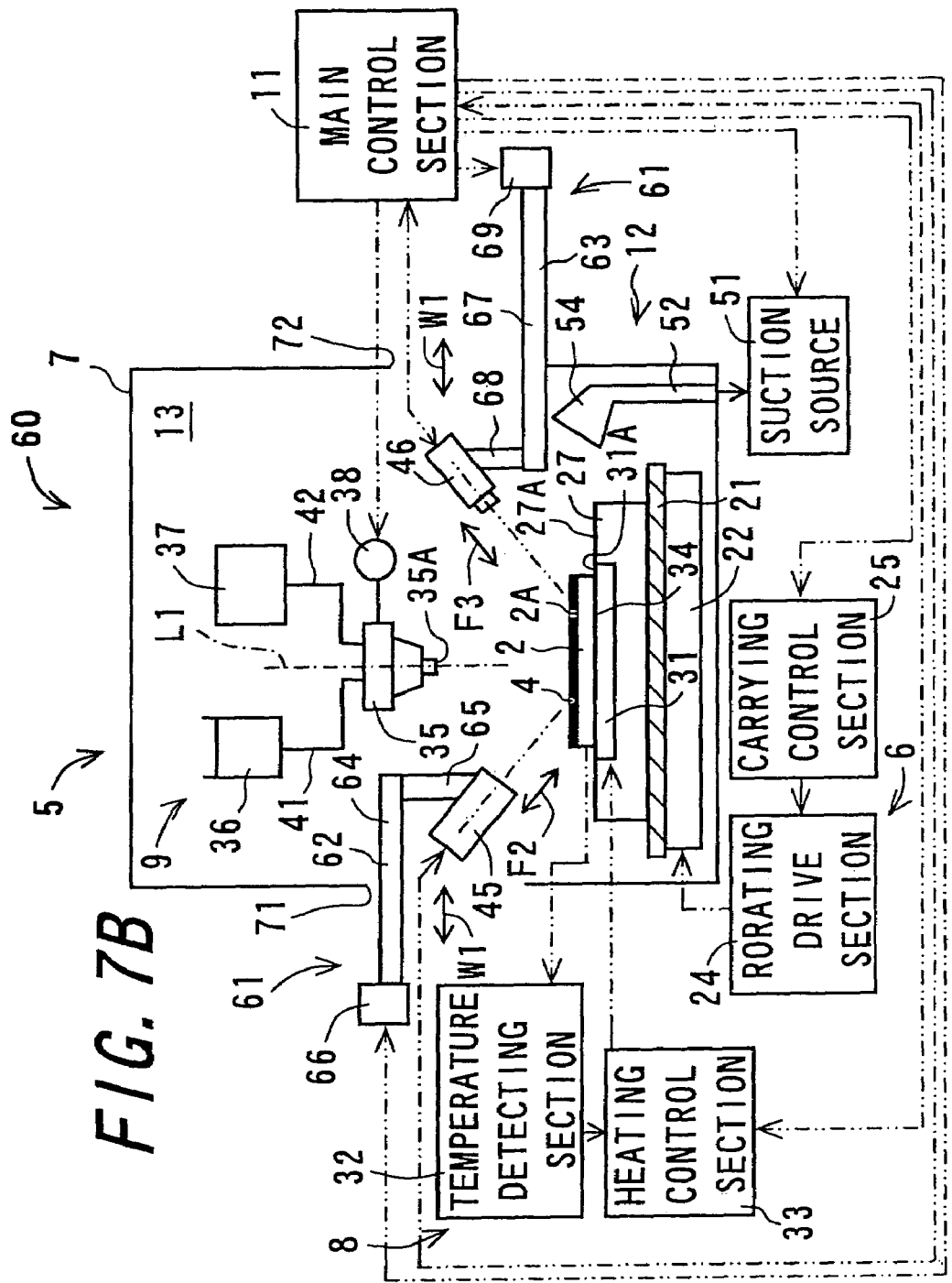

FIGS. 7A and 7B are views showing schematically the composition of a thin film forming apparatus 60 according to a second embodiment of this invention. FIG. 7A is a view showing the condition in which the thickness information generating means 10 is saved outside the housing body 7. FIG. 7B is a drawing showing the condition in which the thickness information generating means 10 is arranged inside the housing space 13 of the housing body 7. A thin film forming apparatus 60 of this embodiment is different from the composition of a thin film forming apparatus 1 shown in FIG. 1 of the above-mentioned embodiment, in respect of only a part of composition. Since the rest of the composition is similar to the thin film forming apparatus 1 shown in FIG. 1 mentioned above, similar parts have similar reference numerals or symbols and the description will be omitted.

The thin film forming apparatus 60 has holding means 61, in addition to the composition of the thin film forming apparatus 1 shown in FIG. 1 mentioned above. The holding means 61 holds thickness information generating means 10 so that the thickness information generating means can move from the outside of the housing body 7 to the inside of the housing space 13 and also holds the film forming means 10 so that the film forming means 10 to be housed in the housing space 13 can move from the housing body 7 to the outside. The holding means 61 comprises a first holder 62 for holding a lighting section 45 and a second holder 63 for holding an imaging section 46. The first holder 62 moves together with a first guide rail 64 along the first guide rail 64, and comprises a first moving holder 65 for holding the lighting section 45 and a first driving section 66 to allow the first moving holder 65 to move along the first guide rail 64. The second holder 63 moves together with a second guide rail 67 along the second guide rail 67, and comprises a second moving holder 68 for holding an imaging section 46 and a second driving section 69 to allow the second moving holder 68 to move the second guide rail section 67.

A second and third openings 71,72 for allowing thickness information generating means 10 to move by the holding means 61 from the outside of the housing body 7 to the inside of the housing space 13 is formed on a side wall 7A of the housing body 7. The second and third openings 71,72 are formed on the side wall 7A of the housing holder 7 in a direction perpendicular to the carrying direction F1 in which a substrate 2 is carried.

The first guide rail 64 is passed through the second opening 71 and is arranged from the outside of the housing body 7 to the inside of the housing space 13. The first guide rail 64 is arranged above the carrying means 6 and extends in a virtual horizontal position. One end 73 arranged inside the housing space 13 of the first guide rail 64 is arranged to be saved toward the side from the upper side of the substrate 2 to be arranged in the processing position. The first guide rail 64 is fixed to the housing body 7. The first moving holder 65 is arranged at the lower part of the first guide rail 64 and is connected to the upper part of the lighting section 45. In other words, the lighting section 45 comes to be lifted by the first moving holder 65. The first driving section 66 is realized by, for instance, a motor and causes the first moving holder 65 to move in the direction W1 of extension of the first guide rail 64 by means of the control command given from the main control section 11. The first driving section 66 rotates a male screw component extending along the first guide rail 64, around the axis line of the male screw component. In the first moving holder 65, a female screw part to fit with the screw thread of the male screw component is formed. The first driving section 66 can move the first moving holder 65 by rotating the male screw component in one and the other directions around the axis line of the male screw component.

The second guide rail 67 is passed through the third opening 72 and is arranged from the outside of the housing body 7 to the inside of the housing space 13. The second guide rail 67 is arranged above the carrying means 6 and extends in a virtual horizontal position. One end 74 arranged inside the housing space 13 of the second guide rail 67 is arranged to be saved toward the side from the upper side of the substrate 2 to be arranged in the processing position. The second guide rail 67 is fixed to the housing body 7. The second moving holder 68 is arranged at the upper part of the second guide rail 67 and is connected to the lower part of the imaging section 46. The second driving section 69 is realized by, for instance, a motor and causes the second moving holder 68 to move in the direction W1 of extension of the second guide rail 67 by means of the control command given from the main control section 11. The first guide rail 64 and the second guide rail 67 extend in the same direction. The second driving section 69 rotates a male screw component extending along the second guide rail 67, around the axis line of the male screw component. In the second moving holder 68, a female screw part to fit with the screw thread of the male screw component is formed. The second driving section 69 can move the second moving holder 68 by rotating the male screw component in one and the other directions around the axis line of the male screw component. The first guide rail 64 and the second guide rail 67 are arranged to be perpendicular to the direction W1 in which these first and second guide rails 64 and 67 extend and to be asymmetrical to an assumed plane passing through the center of the substrate 2.

Also, in this embodiment, the main control section 11 preliminary holds information on the thickness of a thin film to be formed by spraying once the prescribed solution 3 by the spraying means 9. The information on the thickness of a thin film to be formed by praying with the prescribed solution 3 by the spraying means 9 is stored in the memory section.

FIGS. 8 and 9 are flow charts showing the processing operation of the main control section 11 for forming a thin film having a prescribed thickness in the thin film forming apparatus 60. In this embodiment, the processing operation of the carrying control section 25 and the heating control section 33 is similar to the thin film forming apparatus 1 in the embodiment described hereinabove, and the description will be omitted. Further, hereto, the lighting section 45 and the imaging section 46 are saved outside the housing body 7 as the initial state. Steps d0 to d7 in the flow chart shown in FIG. 8 corresponds to each of Steps a0 to a7 in the flow chart showing the operation processing of the main control section 11 in the embodiment described hereinbefore shown in FIG. 4, and the description will be omitted because similar operations are carried out.

At Step d8, the main control section 11 judges whether or not the spraying means 9 has sprayed prescribed number of times. At Step d8, when the main control section 11 judges that the spraying means 9 has sprayed the prescribed number of times, then the procedure goes to Step d9, and when the main control section 11 judges that the spraying means 9 has not sprayed the prescribed number of times, then the procedure goes to Step d3. A smaller number of times than the number of times by which a thin film 4 in the prescribed thickness is formed is selected as the prescribed number of times. The prescribed number of times is set by users, and is stored in, for instance, the memory section of the main control section 11.

At Step d9, the main control 11 gives a control command to the holding section 61 to allow the lighting section 45 and the imaging section 46 to move from the outside of the housing body 7 to the prescribed position inside the housing space 13. The prescribed position is a similar position in which the lighting section 45 and imaging section 46 are to be arranged in the case of the thin film forming apparatus 1 in the above-mentioned embodiment.

Next, the procedure goes to Step d10 from Step d9. At Step d10, the main control section 11 obtains the prescribed information from the thickness information generating means 10. At Step d10, specifically, the main control section 11 gives a control command for letting the lighting section 45 emit a light to the lighting section 45 and also gives a control command for driving the imaging section 46, thereby obtaining the prescribed information to be generated by means of the imaging section 46.

Next, the procedure goes to Step d11 of the flow chart shown in FIG. 9 from d10. At Step d11, the main control section 11 assumes the thickness of a thin film formed on one of the surface 2A of a substrate 2, on the basis of the prescribed information obtained at Step d10. Then, the procedure goes to Step d12.

At Step d12, the main control section 11 determines the number of times for spraying by the spraying means 9, on the basis of the thin film thickness assumed based on the prescribed information. The number of times by the spraying means 9 will be determined as described hereinbelow.

Hereinbelow, explanation will be made about the case in which the thickness of a thin film to be formed by one spraying by the spraying means 9 is 50 angstroms (Å). Hereto, when the prescribed thickness of a thin film to be formed by the thin film forming apparatus 60 is 600 angstroms (Å), and the thickness of the thin film formed at Step d11 is assumed to be 500 angstroms (Å) after the prescribed number of times of spraying is finished, then it is necessary to form the thin film of 600 Å−500 Å=100 Å in thickness. As the thickness of a thin film to be formed by one spraying by the spraying means 9 is 50 Å, it is determined that two additional applications of spraying are needed by the spraying means.

Next, the procedure goes to Step d13 from Step d12. At Step d13, the main control section 11 gives a control command to the holding means 61 to allow the lighting section 45 and the imaging section 46 to move from the prescribed position within the housing space 13 of the housing body 7 to the outside of the housing body 7.

Next, the procedure goes to Step d14 from d13. Each of the Steps from Step d14 to Step d18 corresponds to each of the steps from Step a3 to Step a7 of the flow charts showing the operation processing of the main control section 11 of the embodiment shown in FIG. 4 described hereinbefore, and similar processing will be carried out at these steps. Accordingly, the description will be omitted regarding Steps d14 to d18.

At Step d19, the main control section 11 judges whether or not the spraying means 9 has sprayed the prescribed solution 3 the number of times determined at Step d12. When the main control section 11 judges, at Step d19, that the spraying means 9 has sprayed the prescribed solution 3 the number of times determined at Step d12, the procedure goes to Step d20. When the main control section 11 judges, at Step d19, that the spraying means 9 has not sprayed the prescribed solution 3 the number of times determined at Step d12, then the procedure goes to Step d14.

At Step d20, the main control section 11 gives a control command to the carrying control section 25 of the carrying means 6 to allow the substrate 2 to be carried from the main body 5 of the thin film forming apparatus. Then the procedure goes to Step d21, at which the processing is finished. Thus, the substrate 2 with a thin film of the prescribed thickness formed on which is to be held in the substrate holder 27 can be taken out.

As described hereinabove, in the thin film forming apparatus 60, the lighting section 45 and the imaging section 46, without always kept inside the housing space 13, are moved to the inside of the housing space 13 after the spraying means 9 has sprayed the prescribed number of times, thereby hereupon obtaining the prescribed information on the thickness of a thin film formed on the one surface portion 2A of a substrate 2 and are saved again outside the housing body 7. This makes it possible to reduce a clouding that may occur on the lighting section 45 and the imaging lens of the imaging section 46 due to the atomized prescribed solution 3 staying inside the housing space 13 and also makes it possible to obtain accurate information on thickness of a thin film to be formed on the substrate 2.

In another embodiment of the invention, the lighting section 45 may be provided at the upper part of the first guide rail 64, and the imaging section 46 may be provided at the lower part of the second guide rail 67. With such a constitution, similar effects can be obtained.

Figure 12:
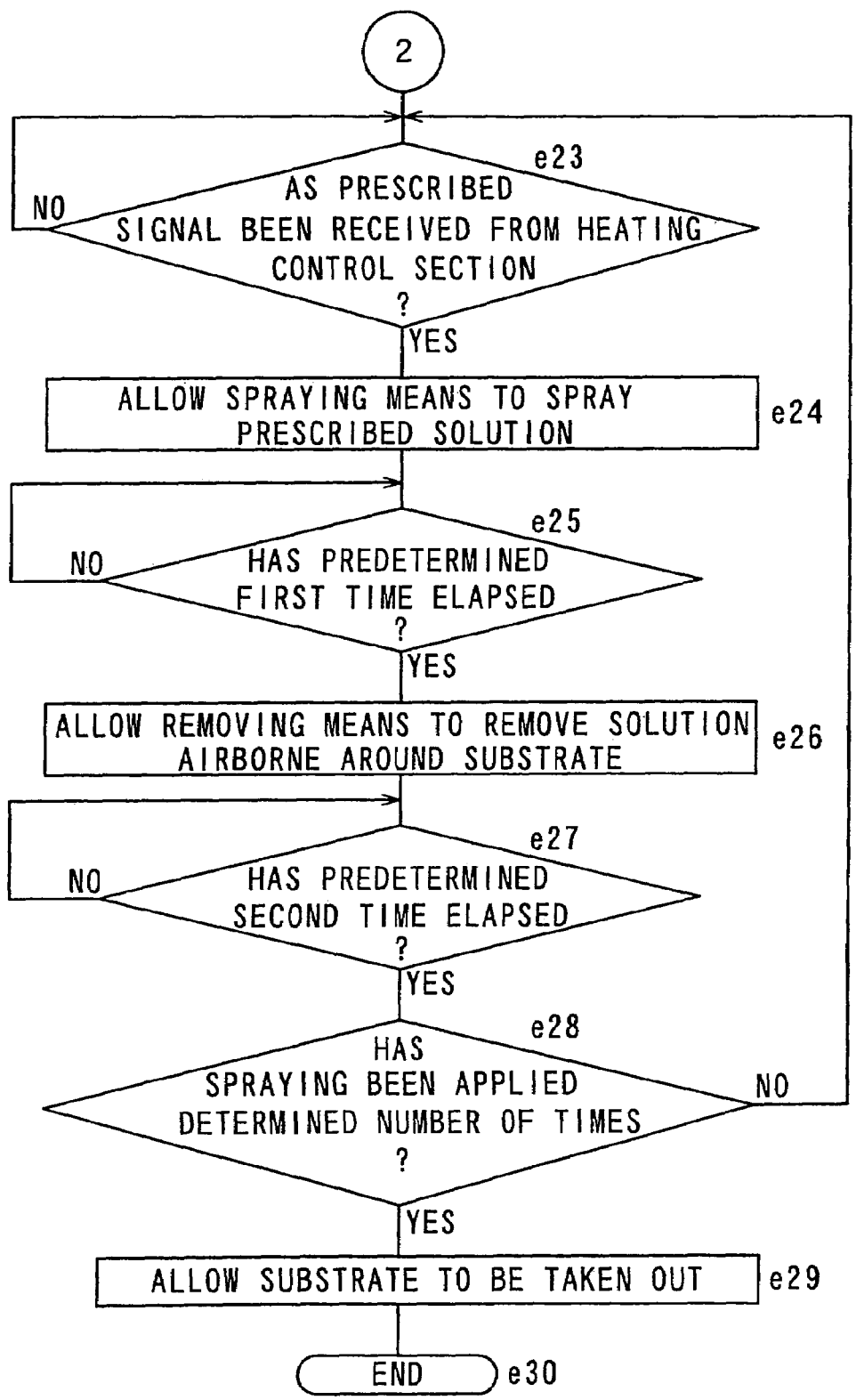
FIG. 12 is a flow chart showing the processing operation of the main control section for forming a thin film having a prescribed thickness in the thin film forming apparatus according to the third embodiment of the invention.

FIG. 10, FIG. 11 and FIG. 12 are flow charts showing the processing operation of the main control section for forming a thick film having a prescribed thickness in a thin film forming apparatus according to a third embodiment of the invention. The thin film forming apparatus of this embodiment has a constitution similar to the thin film forming apparatus 60 shown in FIGS. 7A and 7B described hereinbefore, and the main control section 11 is only differs in the control operation of the main control section 11. Accordingly, overlapping descriptions will be omitted. In this embodiment, since the processing operations of the carrying control section 25 and the heating control section 33 are similar to that in the case of the thin film forming apparatus 1 of the embodiment described hereinbefore, the description will be omitted. Further, in this embodiment, the lighting section 45 and imaging section 46 are saved outside the housing body 7 as an initial condition. Since each of the steps from Step e0 to Step e11 shown in FIG. 10 corresponds to each of the steps from Step d0 to Step d11 of flow chart showing the operation processing of the main control section 11 of the thin film forming apparatus 60 in the embodiment described hereinbefore, as shown in FIG. 8 and FIG. 9, and similar processing is carried out, the description will be omitted.

At Step e12, the main control section 11 gives a control command to the holding means 61, thereby moving the lighting section 45 and imaging section 46 from the prescribed position inside the housing space 13 of the housing body 7 to the outside of the housing body 7.

Next, the procedure goes to Step e13 from Step e12. Since each of the steps from Step e13 to Step e17 corresponds to each of the steps from Step e3 to Step e7, and similar processing is carried out, the description will be omitted. Since each of the steps from Step e18 to Step e21 corresponds to each of the steps from Step e9 to Step e12, and similar processing is carried out, the description will be omitted.

At Step e22, the main control section 11 estimates the thickness of a thin film to be formed by spraying once by the spraying means 9 on the basis of the thickness assumed at Step e11, of a thin film formed on a substrate 2 and the thickness assumed at Step e20, of a thin film formed on the substrate and then determines the number of times for spraying based on this estimation. The number of times for spraying by the spraying means 9 will be determined as follows.

It is assumed that the prescribed thickness of a thin film to be formed by the thin film forming apparatus 60 is 600 angstroms (Å), and after the prescribed number of times of spraying is finished as described hereinabove, the thickness of the thin film assumed at. Step e11 is 500 angstroms (Å), and the thickness of the thin film assumed at Step e20 is 550 angstroms (Å). The main control section 11 finds that one spraying of the prescribed solution 3 by the spraying means 9 will form a thin film in 550 Å–500 Å=50 Å in thickness from the difference between the thin film assumed in Step e20 and the thin film assumed in Step e11. Therefore, in this case, the main control section 11 judges that one more spraying by the spraying means 9 is needed.

Next, the procedure goes to Step e23 shown in FIG. 12. Since each of the steps from Step e23 to Step e27 corresponds to each of the steps from Step e3 to Step e7, and similar processing is carried out, the description will be omitted.

At Step e28, the main control section 11 judges whether or not the spraying means 9 has sprayed the prescribed solution 3 the number of times determined at Step e22. When the main control section 11 judges, at Step e22, that the spraying means 9 has sprayed the prescribed solution 3 the number of times determined at Step e22, the procedure goes to Step e29. When the main control section 11 judges, at Step e22, that the spraying means 9 has not sprayed the prescribed solution 3 the number of times determined at Step e22, then the procedure goes to Step e23.

At Step e29, the main control section 11 gives a control command to the carrying control section 25 of the carrying means 6 to allow the substrate 2 to be carried from the main body 5 of the thin film forming apparatus. Then the procedure goes to Step a30, at which the processing is finished. Thus, the substrate 2 with a thin film of the prescribed thickness formed on which is to be held in the substrate holder 27 can be taken out.

As described hereinabove, in the thin film forming apparatus of this embodiment, as is the case with the thin film forming apparatus 60 of the embodiment described hereinbefore, the lighting section 45 and the imaging section 46, without always kept inside the housing space 13, are moved to the inside of the housing space 13 after the spraying means 13 has sprayed the prescribed number of times, thereby hereupon obtaining the prescribed information on the thickness of a thin film formed on the one surface portion 2A of a substrate 2 and are saved again outside the housing body 7. This makes it possible to reduce a clouding that may occur on the lighting section 45 and the imaging lens of the imaging section 46 due to the atomized prescribed solution 3 staying inside the housing space 13 and also makes it possible to obtain accurate information on thickness of a thin film to be formed on the substrate 2.

In the thin film forming apparatus of this embodiment, unlike the case with the thin film forming apparatus 60 of the embodiment described hereinbefore, it is not necessary to ascertain preliminarily the thickness of a thin film to be formed by spraying once by the spraying means. This makes it possible to form a thin film of the prescribed thickness with high accuracy, even in the case where a change of the spray nozzle portion 35 with time, a change in concentration of the prescribed solution 3, a change of the prescribed solution, a change in atmosphere around the substrate 2 and the like occur.

In this embodiment, the number of times for spraying by the spraying means 9 is only determined. However, the main control section 11 may control the spraying means 9 so that the time of spraying with the prescribed solution 3 by the spraying means 9. This makes it possible to form a thin film of the prescribed thickness with higher accuracy.

Further, in each of the embodiments described hereinbefore, the suction source 51 is operated intermittently, but the suction source 51 may be operated at all times. In this case, the suction source 51 causes an air current in the housing space 13, and therefore, in consideration of this air current, the flow rate of the prescribed solution 3 to be sprayed by the spraying means 9 and the like will be determined. By operating the suction source 51 at all times, it becomes unnecessary to control the suction source 51 by the main control section 11.

The removing means 12 described hereinbefore may have a composition of, introducing, for instance, an air into the housing space 13 to push the air of the housing space out of the housing body 7 or may have a composition of removing the prescribed solution 3 atomized by electrostatic adsorption from the processing space 13.

Furthermore, in each of the embodiments, thickness of a thin film to be formed intermittently on a substrate 2 is assumed, the thickness of a thin film to be formed on a substrate 2 in a time-series manner may be assumed. In this case, by observing sequentially changes of the thickness of a thin film to be formed on the substrate 2, the main control section 11 can control the time for spraying by the spraying means 9, thereby obtaining a thin film of the prescribed thickness with high accuracy.

Figure 13:
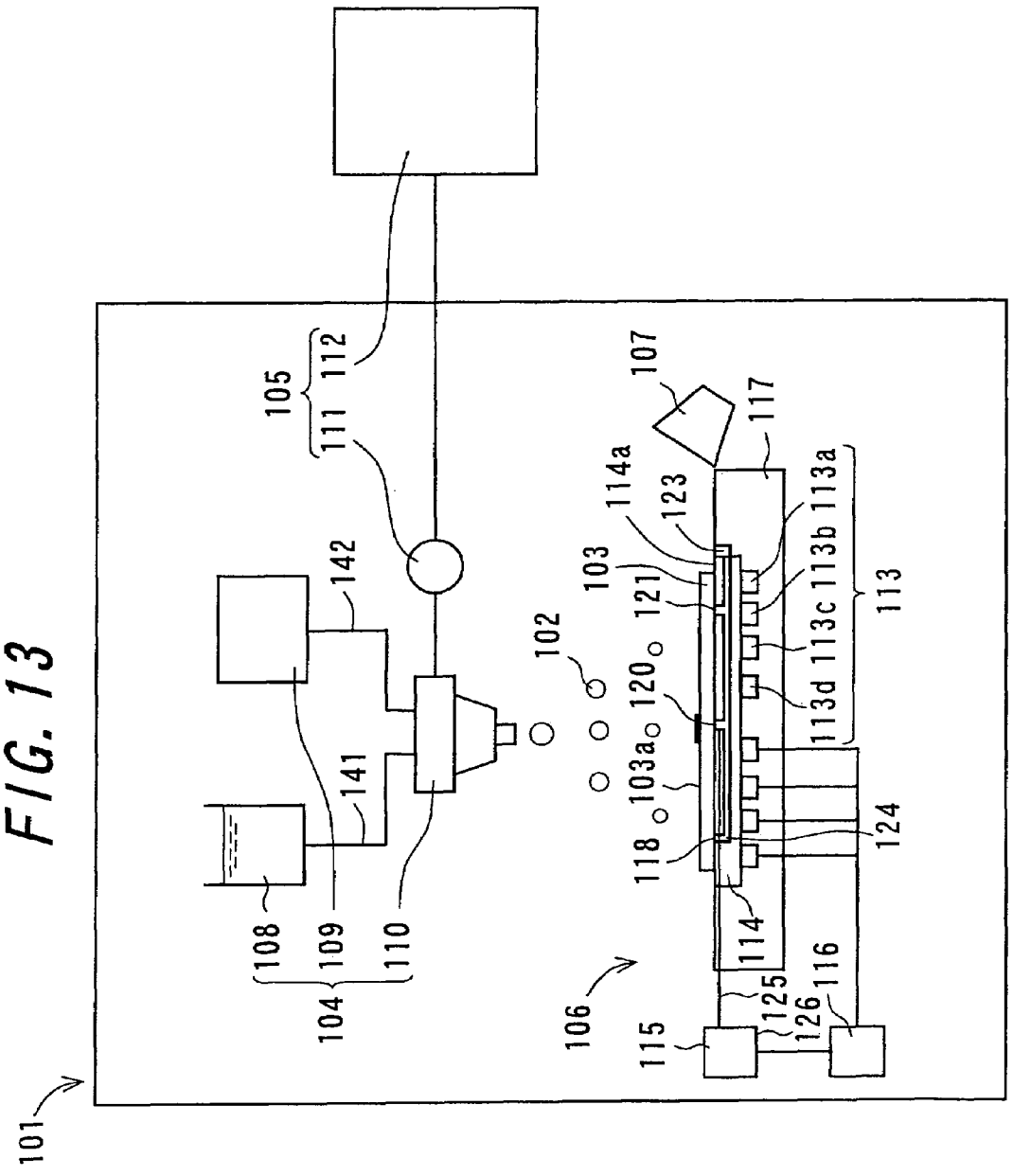
FIG. 13 is a perspective side view showing schematically the constitution of a thin film forming apparatus according to a fourth embodiment of the invention.
Figure 14:
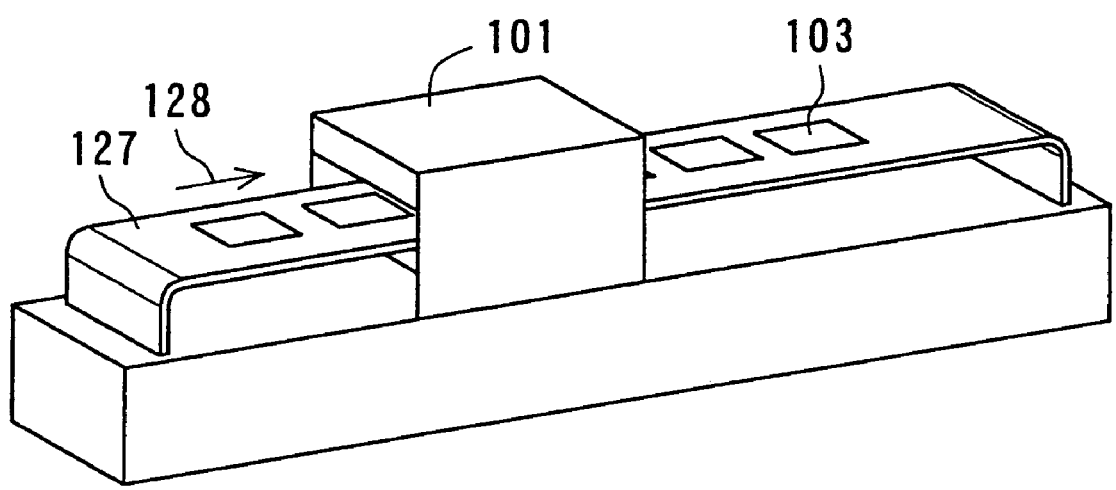
FIG. 14 is a perspective view showing schematically the appearance of the thin film forming apparatus shown in FIG. 13 and substrate carrying means attached thereto.

FIG. 13 is a perspective side view showing schematically a constitution of a thin film forming apparatus 101 according to a fourth embodiment of the invention. FIG. 14 is a perspective view showing schematically an outward appearance of a thin film forming apparatus 101 shown in FIG. 13 and substrate carrying means to be provided attached thereto.

The thin film forming apparatus 101 comprises a material solution spraying means 104, a spraying control means 105, a substrate heating means 106 and an exhausting means 107. The material solution spraying means 104 emits a jet of a mixture of the material solution including a thin film material and an organic solvent with a carrier gas and sprays liquid droplets 102 of the material solution on a surface 103a of a plate-like substrate 103. The spraying control means 105 controls the spraying quantity of the liquid droplets 102 of the material solution. The substrate heating means 106 heats the plate-like substrate 103. The exhausting means 107 exhausts to the outside the carrier gas, an organic solvent vapor evaporating from the material solution by heating.

The material solution spraying means 104 comprises material solution reservoir means 108 for storing a material solution; carrier gas reservoir means 109 for storing a carrier gas; spraying means 110 for mixing the material solution and the carrier gas, emitting a jet of the mixture obtained to a plate-like substrate 103 and spraying liquid droplets 102 of the material solution on a surface 103a of the plate-like substrate 103.

As for a thin film material contained in a material solution to be stored in the material solution reservoir means 108, there is no particular restriction, and known thin film materials may be used. For instance, in the case of forming a titanium thin film, titanium alcoxides such as titanium tetra-iso-propoxide, titanium tetra-n-propoxide, titanium tetra-n-butoxide and tetra-iso-butoxide may be used. Materials normally used in this field may be used for the material solution reservoir means 108, and for instance, containers made of materials which are inactive against the material solution and does not dissolve impurities or the like in the material solution may be used.

For the carrier gas reservoir means 109, general pressure tight cylinders made of materials which are pressure tight in view of the carrier gas being compressed to high pressure gas and do not give impurities to the carrier gas can be used. As a carrier gas, air, nitrogen gas, helium gas, argon gas and the like can be used, but gases such as nitrogen gas, helium gas and argon gas which are inert against the thin film materials and plate-like substrates are preferred, and nitrogen gas is especially preferred. Although the flow rate of a carrier gas can be selected appropriately from a wide range according to kinds of thin film materials and organic solvents contained in the material solution, kinds of carrier gases themselves and constructions and configurations of the spraying means 110, in consideration of that uniformity of film thickness of a thin film to be formed should be further improved, the flow rate may be selected so that the liquid droplets 102 of the material solution has a diameter in the order of several tens to 100 µm.

For the spraying means 110, are used various nozzles such as a spray nozzle. As a spray nozzle, commercially available goods may be used. For instance, a spray nozzle of a trade name of STA-6R (manufactured by Fuso Seiki Co., Ltd.) can be used. The jet emission of the mixture of the material solution and the carrier gas can be carried out several times as necessary. Such a spraying lowers the temperature of a surface 103a of a plate-like substrate 103. The liquid droplets 102 of the material solution 102 is heated on the surface 103a of the plate-like substrate 103. The carrier gas and the gas generating as a result of the evaporation of an organic solvent of the liquid droplets 102 affect the subsequent formation of a thin film, and in order to prevent such an influence, these gases have to be exhausted to the outside by the exhausting means 107. In consideration of the above, a sufficient time interval is preferably left between one spraying and the following spraying.

In the material solution spraying means 104, the material solution obtained by pre-dissolving a thin film material in an appropriate organic solvent is stored in the material solution reservoir means 108, a high-pressure compressed carrier gas is stored in the carrier gas reservoir means 109, and the material solution and the carrier gas are supplied from the respective reservoir means 108, 109 through a solution supply line 141 and a gas supply line 142 to the spraying means 110, where the material solution and the carrier gas supplied to the spraying means 110 are mixed with each other. A jet of the resultant mixture is emitted from the spraying means 110 to a surface 103a of a plate-like substrate. This allows the liquid droplets 102 of the material solution to be sprayed on the surface 103a of the substrate 103. The liquid droplets 102 of the material solution causes a decomposition reaction on the surface 103a of the plate-like substrate 103 to allow an organic solvent to evaporate and to change from liquid to solid phase by gasification, thereby forming a thin film on the surface 103a of the plate-like substrate 103.

The controlling spraying means 105 comprises a solenoid valve 111 and a valve control unit 112. The solenoid valve 111 opens and closes the spraying means 110 and controls ON and OFF of jet emission of the mixture of the material solution and the carrier gas by the spraying means 110. A valve control unit 112 controls the jet emission of the mixture of the material solution and the carrier gas by controlling the operation of the solenoid valve 111. In the spraying control means 105, when a plate-like substrate 103 is carried into the apparatus 101 by a substrate-carrying means 127 to be described hereinbelow and mounted in position, the valve control unit 112 gives a command to the solenoid valve 111, and the solenoid valve 11 allows the spraying means 110 to open, and a jet of the mixture of the material solution and the carrier gas is emitted to the surface 103a of the plate-like substrate 103. Furthermore, after a thin film of the predetermined thickness is formed on the surface 103a of the plate-like substrate 103, the valve control unit 112 gives a command to the solenoid valve 111, and the solenoid valve 111 closes the spraying means 110, thereby stopping the jet emission of the mixture of the material solution and the carrier gas.

The substrate heating means 106 comprises heating means 113, heat conduction means 114, temperature detecting means 115, temperature control means 116 and holding means 117. The heating means 113 heats a plate-like substrate 103. The heat conduction means 114 conducts heat generated by the heating means 113 to the plate-like substrate 103, the temperature detecting means 115 detects temperature distribution of the surface 103a of the plate-like substrate 103, and the temperature control means controls the operation of the heating means 113 so that the plate-like substrate 103 has a prescribed temperature distribution according to the spraying quantity of the material solution per unit area in the plate-like substrate 103 on the basis of the detection result of the temperature detecting means 115. The holding means 117 holds at least the plate-like substrate 103 and the heating means 113.

Figure 15A:
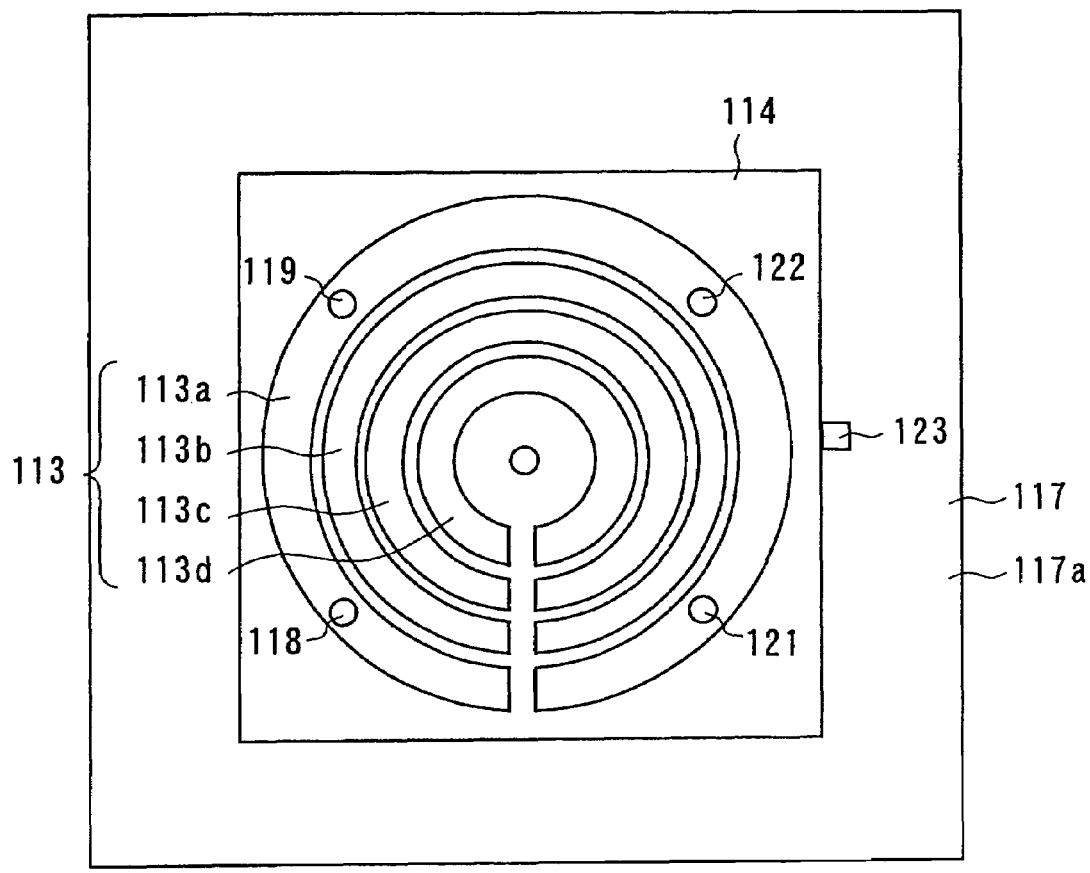
FIGS. 15A and 15B are a perspective plan view and a perspective side view showing schematically the constitution of the heating means, heat conduction means and holding means in the thin film forming apparatus shown in FIG. 13.
Figure 15B:
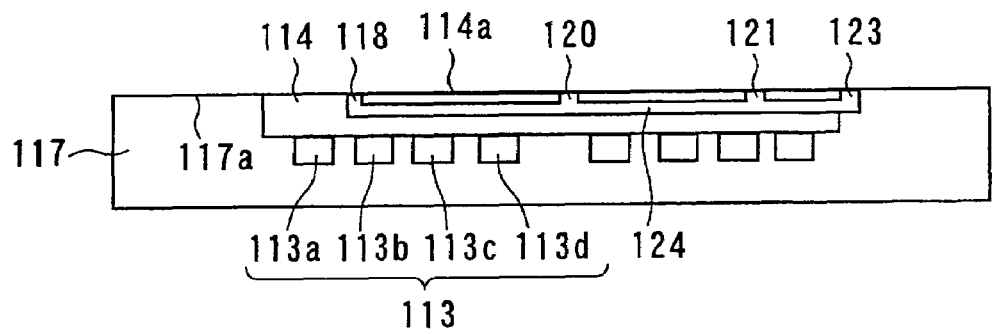

FIGS. 15A and 15B are a perspective plan view and a perspective side view showing schematically the constitution of heating means 113, heat conduction means 114 and holding means 117.

The heating means 113 is arranged in a recess formed on a surface 117a of the holding means 117. The heating means 113 is formed in a substantially annular shape, comprising a plurality of heating components 113a, 113b, 113c, 113d arranged concentrically, and is arranged on the bottom surface of the recess. The heating components 113a, 113b, 113c, 113d are each connected to the temperature control means 116 independently and are each subjected to separate temperature control by the temperature control means on the basis of the detection result of the temperature detecting means 115 for detecting temperature distribution of a surface 103a of the plate-like substrate 103. This enables the surface 103a of the plate-like substrate 103 to have a concentric temperature distribution. For the heating components 113a, 113b, 113c, 113d, heaters composed of resistor of nichrome wire are used.

The heat conduction means 114 is arranged on the upper layer of the heating means 113 in the recess formed on the surface 117a of the holding means 117. On the surface 114a contacting the plate-like substrate 103 are formed a plurality of suction holes 118, 119, 120, 121, 122 for holding the plate-like substrate under suction. These holes are connected to a suction line 124 inside the heat conduction means 114. The suction line 124 is connected to a pipe 123 on the part of the holding means 117 at the part where the heat conduction means 114 and the holding means 117 contact each other. The pipe 123 is connected to a vacuum suction unit (not shown). Since the plate-like substrate 103 is held under suction onto the heat conduction means 114 by the suction holes 118, 119, 120, 121, 122, the plate-like substrate 103 is prevented from dropping off the surface 114a of the heat conduction means 114 during carrying and while a thin film is being formed, and heat transfer from the heat conduction mean 114 to the plate-like substrate 103 can be carried out securely. As the heat conduction means 114, those made of such materials are preferable that the suction holes 118, 119, 120, 121, 122 and the suction line 124 can easily be formed, heat generated from the heating means 113 can be efficiently conducted to the plate-like substrate (not shown), and the diffusion of impurities onto the plate-like substrate can be eliminated at high rate. For instance, a suscepter made of carbon may be used.

Referring to FIG. 13, the temperature detecting means 115 comprises a sensor 125 arranged on the surface of the heat conduction means 114 and the holding means 117 for detecting temperature distribution on the surface 103a of the plate-like substrate 103 and a detector 126 for transferring a signal from the sensor 125 to the temperature control means 116 as a detection result. The information on the temperature distribution on the surface 103a of the plate-like substrate 103 detected by the sensor 125 is transferred to the temperature control means 116 via the detector 126.

The temperature control means 116 is electrically connected to the temperature detecting means 115 and to the heating components 113a, 113b, 113c, 113d. The temperature control means 116 receives the information on temperature distribution of a plate-like substrate 103 from the temperature detecting means 115, and controls separately the heating components 113a, 113b, 113c, 113d on the basis of the information so that the temperature distribution of the plate-like substrate 103 can be adjusted to the prescribed temperature distribution according to the spraying quantity of the material solution per unit area in the plate-like substrate 103. In the case where the heating components 113a, 113b, 113c, 113d are heaters, the temperature control means 116 controls the value of a current flowing to each heater, thereby allowing each heater to control a heating temperature. As a result, variations in temperature distribution are controlled within the prescribed range so that the thickness of a thin film to be formed is adjusted to be substantially uniform.

The holding means 117 holds the heating means 113 and the heat conduction means 114 in the recess formed on the surface 117a of the holding means 117, and a pipe 123 is arranged on one side of the recess contacting the heat conduction means 114. One end of the pipe 123 is connected to a suction line 124 formed inside the heat conduction means 114, and the other end of the pipe 123 is connected to a vacuum suction apparatus (not shown).

According to the substrate heating means 106 having such a constitution, the plate-like substrate 103 mounted on the surface 114a of the heat conduction means 114 is held under suction by the suction holes 118, 119, 120, 121, 122 formed on the surface of the heat conduction means 114, and the temperature distribution of the surface of the plate-like substrate 103 is adjusted to the prescribed temperature distribution in accordance with the spraying quantity of the material solution per unit area in the plate-like substrate 103, by the heating components 113, the heat conduction means 114, temperature detecting means and the temperature control means 116.

The exhaust means 107 is arranged so that when liquid droplets 2 of the carrier gas and the material solution to be emitted to the plate-like substrate 103 are heated on the surface 3a of the plate-like substrate 103, the resultant gas produced by evaporation of an organic solvent contained in the liquid droplets can be exhausted to the outside. In the exhausting means 107, general exhaust units can be used. Although the exhaust means 107 may be operated at all times, it is preferred to stop operating the exhaust means 107 during the spraying operation because air current caused by this exhaust may affect the spraying quantity of the liquid droplets 102 of the material solution.

Also, as shown in FIG. 14, accompanying the thin film forming apparatus 101, substrate carrying means 127 for carrying the plate-like substrate 103 into the thin film forming apparatus 101 is arranged. The plate-like substrate 103 is mounted on the substrate carrying means 127 in a state of being mounted on the substrate heating means 106. As the substrate carrying means 127, a belt conveyor, for instance, is used. The plate-like substrate 103 is moved by the substrate carrying means 127 in the direction shown by an arrow 128, is carried into the thin film forming apparatus 1, where a thin film is formed, and thereafter, is taken out again by the substrate carrying means 127.

Figure 16:
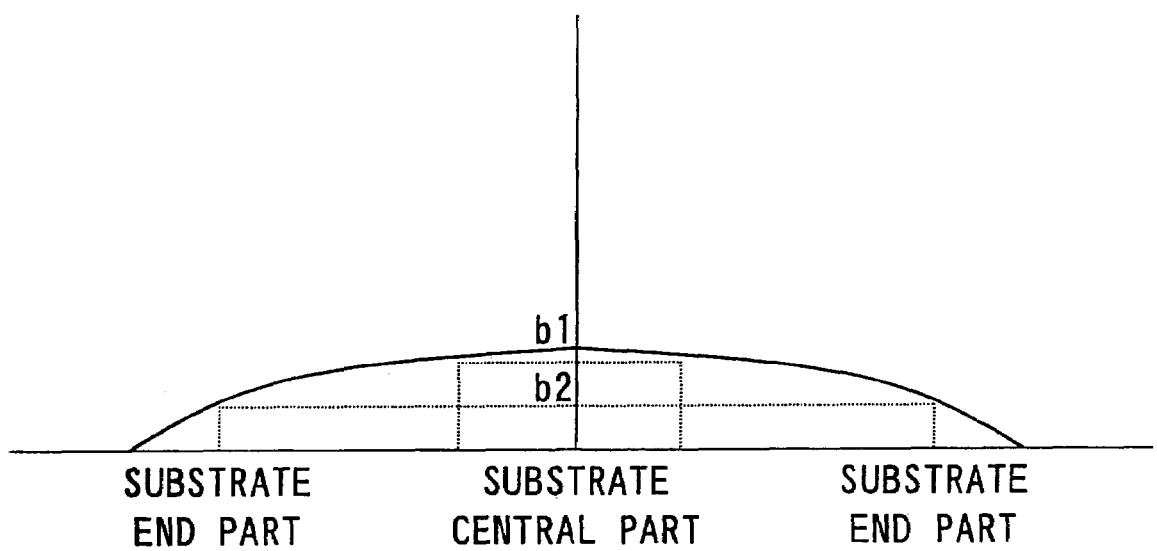
FIG. 16 is a graph showing the spraying quantity of a material solution per unit area in each part of a surface of a plate-like substrate.

FIG. 16 is a graph showing the spraying quantity of the material solution liquid droplets 102 per unit area in each part of the surface 103a of the plate-like substrate 103. As is shown in FIG. 14, the spraying quantity at the central part of the plate-like substrate 103 arranged approximately just below the spraying means 110 is b1, and the nearer the distance from the central part to the end, the smaller the spraying quantity becomes at a slow pace, and at the end of the plate-like substrate 103, the spraying quantity is b2. Although the spraying quantity of the liquid droplets 102 of the material solution varies with various conditions such as the kind and concentration of a thin film material contained in the material solution, the kind of an organic solvent, the flow rate of a carrier gas, the construction of the spraying means 110, the distance from the spraying means 110 to the surface 103a of the plate-like substrate 103, the spraying quantity at the central part is always larger than that at the end. It, therefore, becomes necessary to determine preliminarily the spraying quantity by measuring the spraying quantity of each part in the surface 103a of the plate-like substrate 103 in spraying after determining the value each of the conditions which affect the spraying quantity.

Figure 17:
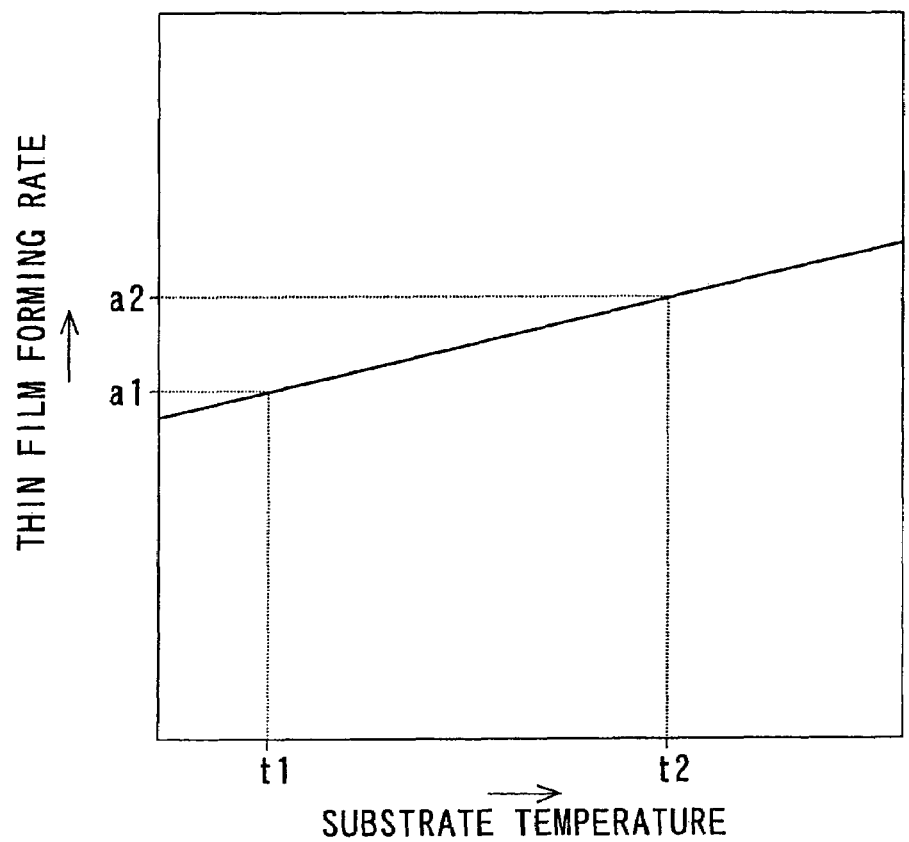
FIG. 17 is a graph showing the relationship of a surface temperature and a thin film formation speed in a plate-like substrate.

FIG. 17 is a graph showing the relationship between the temperature of the surface 103a of the plate-like substrate 103 and the thin film formation speed on the surface 103a of the plate-like substrate 103. As is shown in FIG. 17, when the temperature of the surface 3a of the plate-like substrate 103 is t2, the thin film formation speed is a2. And, t1>t2 and a1>a2. That is to say, the surface temperature of the plate-like substrate and the thickness of a thin film to be formed are in a substantially directly proportional relationship. Therefore, by adjusting the temperature distribution of the surface 103a of the plate-like substrate 103 to be inversely proportional to the prescribed spraying quantity of the liquid droplets of the material solution per unit area in the plate-like substrate 103, a thin film of a more uniform thickness can be formed. Note that in FIG. 17, the thickness of a thin film is an indicative of the thin film formation speed, and FIG. 17 shows the relative rate for forming a thin film. Further, since the values of t1, t2, a1 and a2 vary with various conditions such as the kind and concentration of the thin film material in the material solution, kind of the organic solvent, the spraying quantity of liquid droplets of the material solution, the temperature of the plate-like substrate, it is desired that the valves be preliminarily determined by carrying out spraying actually after these conditions are each set to a constant value.

Figure 18:
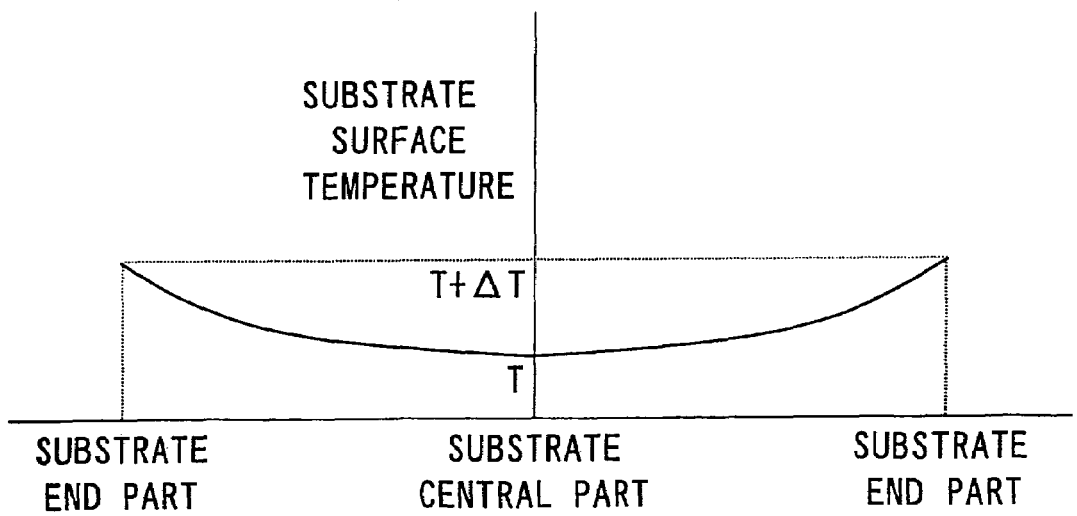
FIG. 18 is a graph showing temperature distribution of a surface of a plate-like substrate when the plate-like substrate is heated in the thin film forming apparatus shown in FIG. 13.

FIG. 18 is a graph showing temperature distribution of the surface 103a of a plate-like substrate 103 when the plate-like substrate 103 is heated by the substrate heating means 106. In the graph of FIG. 18, the vertical axis shows the temperature of a substrate surface, and the horizontal axis, in the center of which the central part of the substrate is arranged, shows relatively the distance from the substrate central part to both ends. Approximately just above the substrate central part, a spray nozzle as spraying means is arranged and allows the jet emission of the mixture of the material solution and a carrier gas. It is apparent from FIG. 18 that as for the plate-like substrate 103 heated by the substrate heating means 106, the surface temperature of the central part is T, and that the nearer the distance from the central part to both the ends becomes, the higher the surface temperature becomes at a slow pace, and that the surface temperature increases to T+$\Delta$T.

The $\Delta$T shown in FIG. 18 can be determined by the following equation, on the basis of the spraying quantity (b1) at the central part of the plate-like substrate 103 and the spraying quantity (b2) at the end as shown in FIG. 16, and the temperature of the surface 103a of the plate-like substrate 103 and the thickness of a thin film to be formed (film thickness a1 at surface temperature t1, film thickness a2 at surface temperature t2) as shown in FIG. 17.

$$\Delta T=[(a1/r)-a1]\times[(T2-T1)/(a2-a1)],$$

wherein r=b1/b2.

Therefore, a thin film of a uniform thickness can be formed by heating by the substrate heating means 106 so that the surface temperature at the central part of the plate-like substrate becomes T and the surface temperature at the end of the plate-like substrate 103 becomes T+$\Delta$T by determining $\Delta$T based on the above expression. The heating between the central part and the and may be complemented appropriately, and for instance, linear complementing may be carried out.

Furthermore, although in the above description, an optimum surface temperature at the central part and the end of the plate-like substrate is determined, the heating may be controlled by calculating an optimum surface temperature in a similar step even in the intermediate part between the central part and the end, in order to obtain a thin film of a more uniform thickness.

Hereinbelow, based on FIGS. 13, 14, explanation is given regarding the operation of a thin film formation on the surface 103a of the plate-like substrate 103 by means of the thin film forming apparatus 1. First, in the thin film forming apparatus 1, the spraying quantity of liquid droplets 102 of the material solution is determined. The relationship the surface temperature at the surface 103a of the plate-like substrate 103 and the thickness of a thin film to be formed is obtained to set an optimum surface temperature distribution to form a thin film of a uniform thickness. Next, by means of the substrate carrying means 125, the plate-like substrate 103 mounted on the substrate heating means 106 is carried into the thin film forming apparatus 101, the position of the plate-like substrate 103 is adjusted so that the central part of the plate-like substrate 103 comes to be just below the material solution spraying means 104, the plate-like substrate 103 is fixed onto the substrate heating means 106 by vacuum suction and then is heated so that the prescribed surface temperature distribution is attained. By spraying liquid droplets of the material solution from the material solution spraying means 104, a thin film is formed on the surface 3a of the plate-like substrate 103. The plate-like substrate 103 on which a thin film is coated is taken out to the outside by the substrate carrying means 125.

Figure 19A:
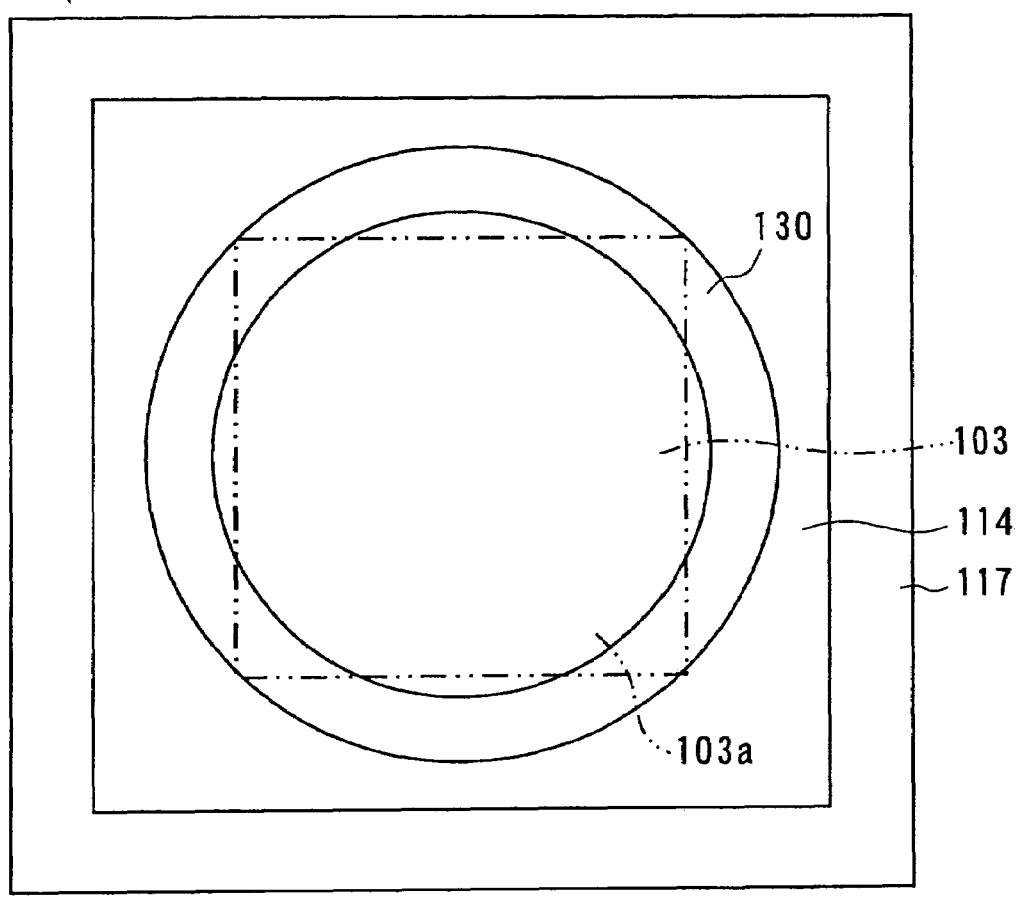
FIGS. 19A and 19B are a perspective plan view and a perspective side view showing schematically the constitution of substrate heating means of another embodiment of the invention.
Figure 19B:
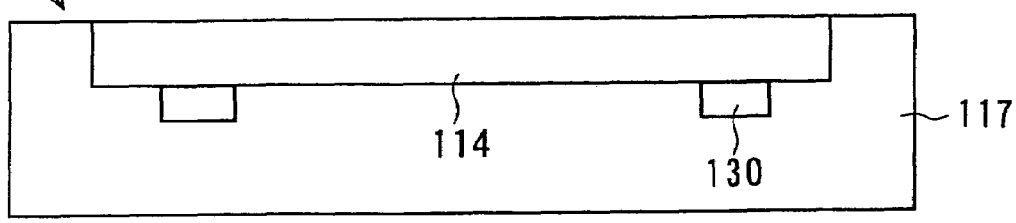
Figure 20:
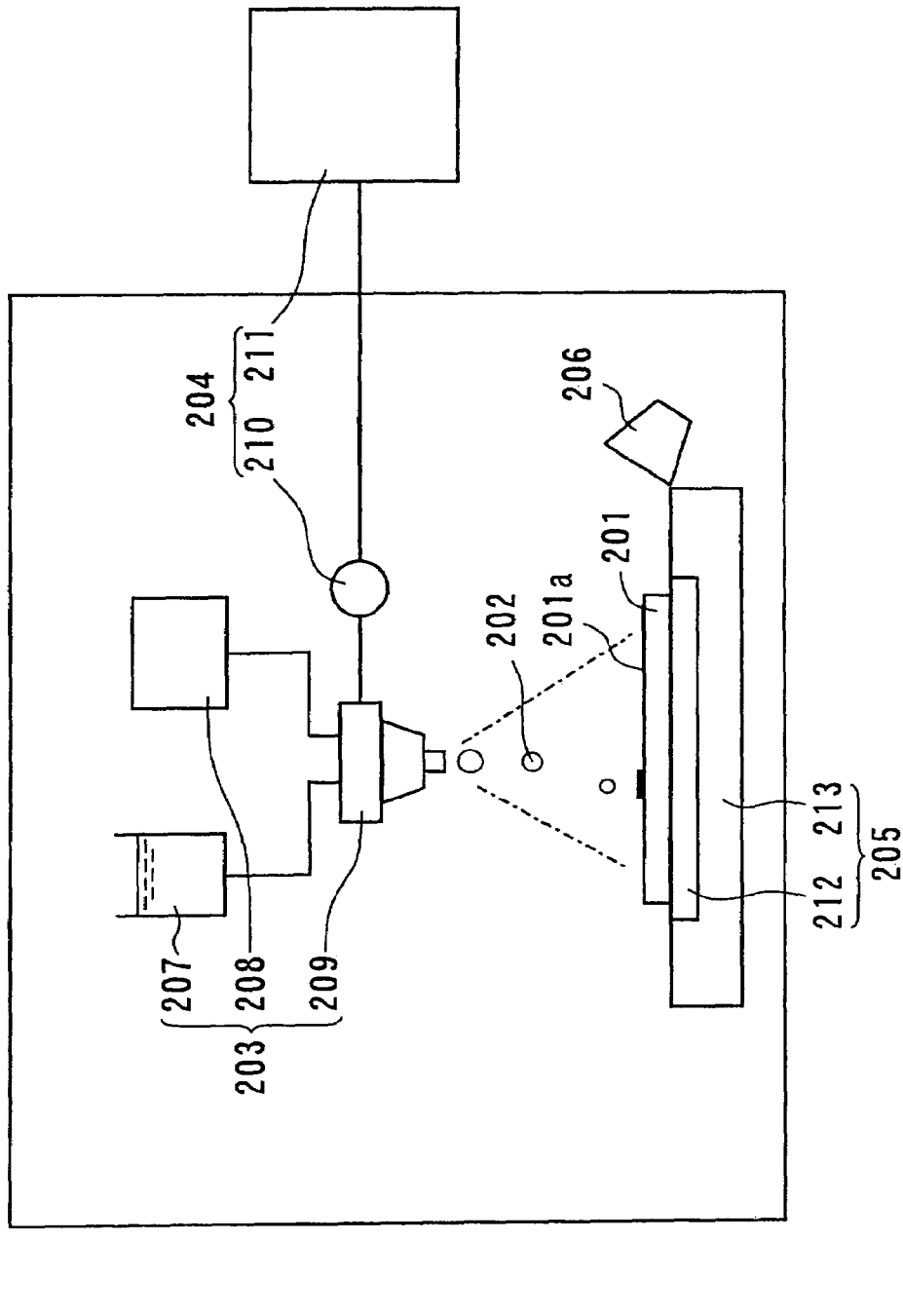
FIG. 20 is a perspective side view showing schematically the constitution of a conventional thin-film forming apparatus.

In this embodiment, as shown in FIG. 17, in the substrate heating means 106, the heating means 113 for generating heat for heating the plate-like substrate 103 is formed in the substantially annular shape, composing a plurality of heating components 113a, 113b, 113c, 113d arranged concentrically, but not limited thereto, may be composed of one heating component in the substantially annular shape. FIGS. 19A and 19B, are a perspective plan view and a perspective side view showing schematically the constitution of a substrate heating means 129 of another embodiment in the thin film forming apparatus of the invention. Since the substrate heating means 129 has the same constitution as the substrate heating means 106 except the heating means 130, the same reference symbols are marked in, and the description is omitted. Also, with respect to the suction holes and suction line which are formed in the heat conduction means 114, the temperature detection means 115, the temperature control means 116 and the pipe to be arranged in the holding means 117, illustrations are omitted. The substrate heating means, 129 is characterized in that the heating means 130 is composed of one heating component in the substantially annular shape. The heating means 130 is arranged down below the outer periphery of the plate-like substrate 103 to be mounted on the heat conduction means 114, and the plate-like substrate 103 is mainly heated at the ends. Thereby, in the surface 103a of the plate-like substrate 103, the temperature distribution is realized in such a manner that the temperature at the central part is low and that at the ends is high. Such substrate heating means 129 can be used suitably for the formation of a thin film not requiring uniformity in film thickness so accurate as in the case with a anti-reflection film, for instance. The substrate heating means 129 is advantageous industrially because the construction is more simplified than the substrate heating means 106.

Although in this embodiment, a belt conveyer is used as the substrate carrying means 125 accompanying the thin film forming apparatus 101, other known moving systems may be used such as a walking beam system.

By using the thin film forming apparatus according to this invention, a thin film such as titanium oxide film, tin oxide film, tin sulfide film, indium oxide film and ITO film are easily formed.

The invention can be carried out in other various forms without departing from the spirit or major features of the invention. Therefore, the embodiments described hereinbefore are mere examples in every respect, the scope of this invention is that shown in the claims, and is not bound by the text of the specification. Furthermore, all variations or changes belonging to the claims fall in the scope of the invention.

What is claimed is:

1. A thin film forming apparatus comprising:
   a housing body having a housing space formed therein for housing a substrate;
   heating means for heating the substrate housed inside the housing space to a prescribed temperature;
   spraying means for spraying a prescribed solution containing a thin film forming material onto one surface portion of the substrate housed in the housing space and heated to the prescribed temperature by the heating means;
   thickness information generating means for generating prescribed information on thickness of a thin film being formed on the one surface portion of the substrate by the thin film forming material;
   control means for allowing the spraying means to spray the prescribed solution containing the thin film forming material so that the thin film being formed on the one surface portion of the substrate has a prescribed thickness, on the basis of the prescribed information from the thickness information generating means;
   holding means for holding the thickness information generating means in such a manner as to be movable into or out of the housing body as the substrate remains fixed inside the housing space; and
   removing means for removing from the housing space the solution which is sprayed by the spraying means and floats around the substrate inside the housing space, wherein the removing means includes at least a suction line operably connected to the housing space for removing by suction the solution floating around the substrate.

2. The thin film forming apparatus of claim 1, wherein the control means has information on thickness of a thin film to be formed on the one surface portion of the substrate through one spraying by the spraying means, and allows the spraying means to spray a prescribed number of times and thereafter, allows the spraying means to spray the solution containing the thin film forming material so that the thin film to be formed on the one surface portion of the substrate has the prescribed thickness, on the basis of the prescribed information from the thickness information generating means and the information on thickness of a thin film on the one surface portion of the substrate through one spraying by the spraying means.

3. The thin film forming apparatus of claim 1, wherein the control means allows the spraying means to spray a prescribed number of times, calculates thickness information of a thin film to be formed on the one surface portion of the substrate through one spraying by the spraying means on the basis of the prescribed information from the thickness information generating means, and allows the spraying means to spray the solution containing the thin film forming material so that the thin film to be formed on the one surface portion of the substrate has the prescribed thickness, on the basis of the prescribed information obtained by the thickness information generating means and the calculated thickness information of the thin film to be formed on the one surface portion of the substrate through one spraying by the spraying means.

4. The thin film forming apparatus of claim 1, wherein the thickness information generating means generates color shading information on a thin film to be formed on the one surface portion of the substrate.

5. The thin film forming apparatus of claim 1, wherein the thickness information generating means produces spectral reflectivity of a thin film to be formed on the one surface portion of the substrate.

* * * * *